(12) United States Patent
Lee et al.

(10) Patent No.: US 12,360,665 B2
(45) Date of Patent: Jul. 15, 2025

(54) STORAGE DEVICE FOR EXECUTING PROCESSING CODE AND OPERATING METHOD OF THE STORAGE DEVICE

(71) Applicant: Samsung Electronics Co., Ltd., Suwon-si (KR)

(72) Inventors: Youngmin Lee, Seoul (KR); Changjun Lee, Seoul (KR); Jinmyung Yoon, Yongin-si (KR); Gyuseok Choe, Hwaseong-si (KR); Seongwan Hong, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 319 days.

(21) Appl. No.: 17/395,582

(22) Filed: Aug. 6, 2021

(65) Prior Publication Data
US 2022/0197510 A1    Jun. 23, 2022

(30) Foreign Application Priority Data

Dec. 17, 2020    (KR) .......................... 10-2020-0177851

(51) Int. Cl.
*G06F 3/06* (2006.01)
(52) U.S. Cl.
CPC .......... *G06F 3/0604* (2013.01); *G06F 3/0631* (2013.01); *G06F 3/0659* (2013.01); *G06F 3/0679* (2013.01)
(58) Field of Classification Search
CPC .... G06F 3/0604; G06F 3/0631; G06F 3/0659; G06F 3/0679; G06F 12/1491; G06F 9/268; G06F 21/602; G06F 21/79
See application file for complete search history.

(56) References Cited

U.S. PATENT DOCUMENTS

| | | | |
|---|---|---|---|
| 6,525,971 B2 | 2/2003 | Merritt et al. | |
| 8,086,896 B2 | 12/2011 | Allen et al. | |
| 8,250,267 B2 | 8/2012 | Logan | |
| 8,266,099 B2 | 9/2012 | Vaghani | |
| 9,189,334 B2 | 11/2015 | Bennett | |
| 10,216,630 B1 | 2/2019 | Shang et al. | |
| 10,263,644 B1 | 4/2019 | Mazahreh et al. | |
| 10,275,176 B1 | 4/2019 | Gold et al. | |
| 2005/0235132 A1 | 10/2005 | Karr et al. | |
| 2015/0134929 A1 | 5/2015 | Anderson et al. | |
| 2016/0378401 A1* | 12/2016 | Savic | G06F 3/061 710/74 |
| 2018/0300064 A1* | 10/2018 | McGlaughlin | G06F 3/061 |

(Continued)

FOREIGN PATENT DOCUMENTS

| | | |
|---|---|---|
| KR | 101472493 B1 | 12/2014 |
| KR | 102004408 B1 | 7/2019 |

*Primary Examiner* — Masud K Khan
(74) *Attorney, Agent, or Firm* — Muir Patent Law, PLLC

(57) ABSTRACT

An operating method of a storage device, including a core and a memory, includes receiving a first processing code configured to enable execution of a first task and storing the first processing code in a first logical unit separately allocated in the memory for near-data processing (NDP), in response to a write command received from a host device, activating the core for executing the first processing code, in response to an activation command received from the host device, and executing the first task by using the core, in response to an execution command received from the host device.

18 Claims, 25 Drawing Sheets

(56) References Cited

U.S. PATENT DOCUMENTS

| | | | |
|---|---|---|---|
| 2019/0155541 A1* | 5/2019 | Chan | G06F 3/0659 |
| 2019/0303014 A1* | 10/2019 | Song | G06F 3/0658 |
| 2020/0159696 A1* | 5/2020 | Adluri | H04L 9/14 |
| 2020/0310690 A1* | 10/2020 | Annavaram | G06F 3/0631 |
| 2021/0377038 A1* | 12/2021 | Duan | H04L 9/3239 |

\* cited by examiner

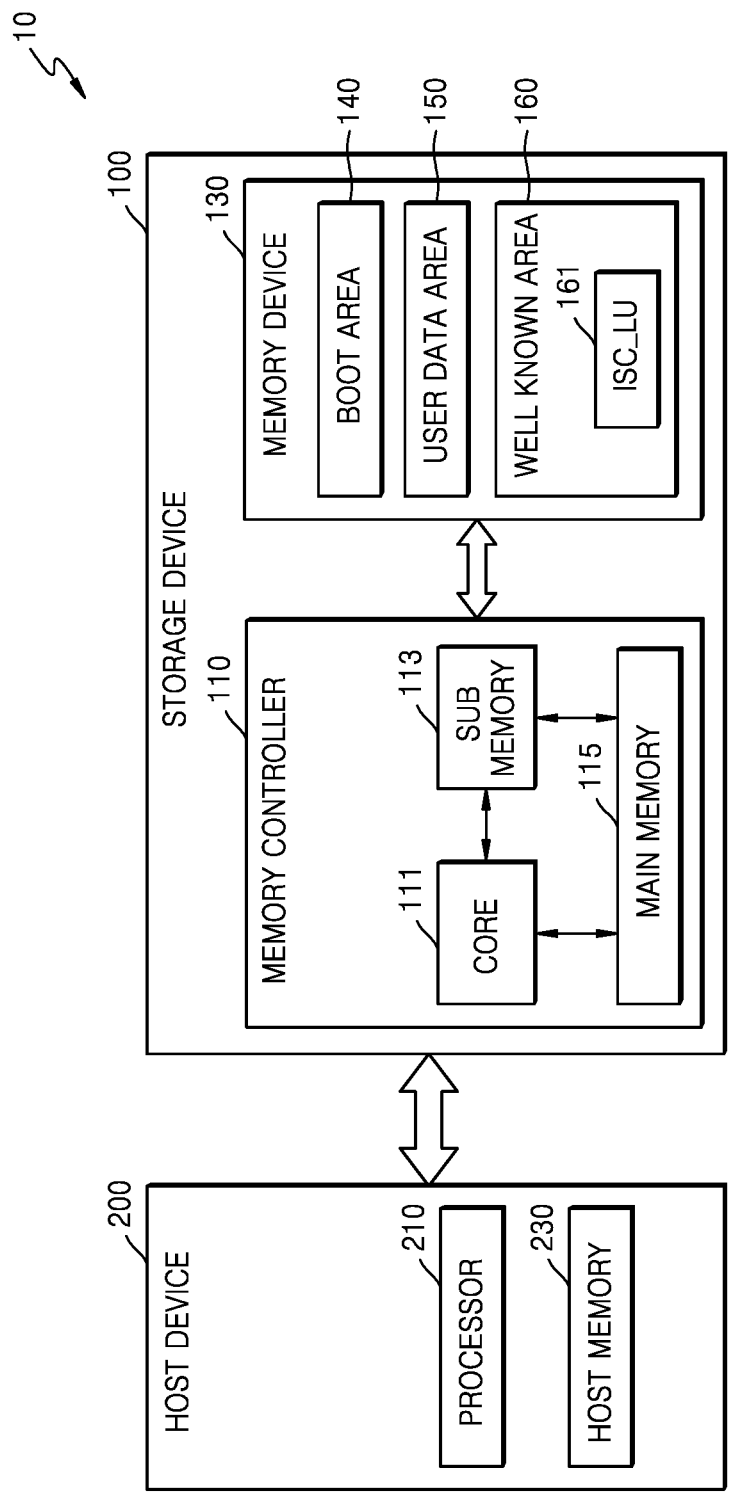

FIG. 3B

| Well known logical unit | W-LUN | LUN Field in UPIU | Command name |
|---|---|---|---|
| REPORT LUNS | 01h | 81h | INQUIRY, REQUEST SENSE, TEST UNIT READY, REPORT LUNS |
| UFS Device | 50h | D0h | INQUIRY, REQUEST SENSE, TEST UNIT READY, START STOP UNIT, FORMAT UNIT |
| Boot | 30h | B0h | INQUIRY, REQUEST SENSE, TEST UNIT READY, READ (6), READ (10), READ (16) |
| REMB | 44h | C4h | INQUIRY, REQUEST SENSE, TEST UNIT READY, SECURITY IN SECURITY OUT |

FIG. 7A

| COMMAND UPIU | | | | | | |
|---|---|---|---|---|---|---|
| 0 xx00 0001b | | 1 Flags | 2 LUN | | 3 Task Tag | |
| 4 IID | Command Set Type | 5 Reserved | 6 Reserved | | 7 Reserved | |
| 8 Total EHS Length (00h) | | 9 Reserved | 10 (MSB) Data Segment Length (0000h) | | 11 (LSB) | |
| 12 (MSB) | | 13 Expected Data Transfer Length | 14 | | 15 (LSB) | |
| 16 CDB[0] | | 17 CDB[1] | 18 CDB[2] | | 19 CDB[3] | |
| 20 CDB[4] | | 21 CDB[5] | 22 CDB[6] | | 23 CDB[7] | |
| 24 CDB[8] | | 25 CDB[9] | 26 CDB[10] | | 27 CDB[11] | |
| 28 CDB[12] | | 29 CDB[13] | 30 CDB[14] | | 31 CDB[15] | |
| Header E2ECRC (omit if HD0) | | | | | | |

FIG. 7B

| RESPONSE UPIU ||||
|---|---|---|---|
| 0<br>xx00 0001b | 1<br>Flags | 2<br>LUN | 3<br>Task Tag |
| 4<br>IID / Command Set Type | 5<br>Reserved | 6<br>Reserved | 7<br>Status |
| 8<br>Total EHS Length (00h) | 9<br>Device Information | 10 (MSB)<br>Data Segment Length | 11 (LSB) |
| 12 (MSB) | 13<br>Residual Transfer Count | 14 | 15 (LSB) |
| 16 | 17<br>Reserved | 18 | 19 |
| 20 | 21<br>Reserved | 22 | 23 |
| 24 | 25<br>Reserved | 26 | 27 |
| 28 | 29<br>Reserved | 30 | 31 |
| Header E2ECRC (omit if HD0) ||||
| k (MSB)<br>Sense Data Length | k+1 (LSB) | k+2<br>Sense Data[0] | k+3<br>Sense Data[1] |
| ... | ... | ... | ... |
| k+16<br>Sense Data[14] | k+17<br>Sense Data[15] | k+18<br>Sense Data[16] | k+19<br>Sense Data[17] |
| Data E2ECRC (omit if DDC) ||||
| NOTE1 k = 32 if HD = 0. ||||

FIG. 14

| bit byte | 7 | 6 | 5 | 4 | 3 | 2 | 1 | 0 |
|---|---|---|---|---|---|---|---|---|
| 0 | OPERATION CODE (C0h) ||||||||
| 1 | VENDOR OPERATION CODE ||||||||
| 2 | VENDOR OPERATION SPECIFIC FIELD ||||||||
| ... | ||||||||
| 11 | ||||||||
| 12 | ALLOCATION LENGTH ||||||||
| ... | ||||||||
| 15 | ||||||||

STORAGE DEVICE FOR EXECUTING PROCESSING CODE AND OPERATING METHOD OF THE STORAGE DEVICE

CROSS-REFERENCE TO RELATED APPLICATION

This application is based on and claims priority under 35 U.S.C. § 119 to Korean Patent Application No. 10-2020-0177851, filed on Dec. 17, 2020, in the Korean Intellectual Property Office, the disclosure of which is incorporated by reference herein in its entirety.

BACKGROUND

The inventive concept relates to a storage device, and more particularly, to a storage device for executing a processing code and an operating method of the storage device.

Storage devices such as solid state drive (SSD), non-volatile memory express (NVMe), embedded multimedia card (eMMC), and universal flash storage (UFS), using non-volatile memory devices, are being widely used. Storage devices include a core for processing a memory operation and cooperate with a host device.

Host devices load data, stored in a storage device, to a host memory, and the host memory processes the data. An overhead occurs in a process of transferring data between a storage device and a host device. However, as high computing performance is needed, a processing speed of the host device typically needs to increase.

SUMMARY

The inventive concept provides a storage device for directly executing a processing code for a task and an operating method of the storage device.

In order to accomplish such an object, an operating method of a storage device according to an embodiment is disclosed. According to an aspect of the inventive concept, an operating method of a storage device including a core and a memory includes receiving a first processing code configured to enable execution of a first task and storing the first processing code in a first logical unit separately allocated in the memory for near-data processing (NDP), in response to a write command received from a host device, activating the core for executing the first processing code, in response to an activation command received from the host device, and executing the first task by using the core, in response to an execution command received from the host device.

According to another aspect of the inventive concept, an operating method of a storage device including a memory and a core includes receiving an encryption code, obtained by encrypting a processing code configured to execute a task, from a host device, verifying a hash value of the encryption code based on a private key and obtaining the processing code by decrypting the encryption code based on verification success, storing the processing code in a first logical unit separately allocated in the memory for near-data processing (NDP), activating the core when the core is in an idle status, and performing the task by using the core.

According to another aspect of the inventive concept, a storage device includes a memory controller and a memory device, wherein the memory controller includes a core, a sub-memory tightly coupled to the core and a main memory connected to the core and the sub-memory. The memory device is a logical unit, is separately allocated for near-data processing (NDP), and is configured to store a processing code for executing a task, and the core is configured to execute the task on the basis of the processing code stored in the first logical unit.

BRIEF DESCRIPTION OF THE DRAWINGS

Embodiments of the inventive concept will be more clearly understood from the following detailed description taken in conjunction with the accompanying drawings in which:

FIG. 1 is a block diagram illustrating a memory system according to an embodiment;

FIGS. 3A and 3B are tables showing a well-known area according to an embodiment;

FIGS. 7A and 7B are tables showing a configuration of each of a response and an instruction according to an embodiment;

FIG. 14 is table showing a configuration of a command according to an embodiment;

DETAILED DESCRIPTION OF THE EMBODIMENTS

Figure 2A:
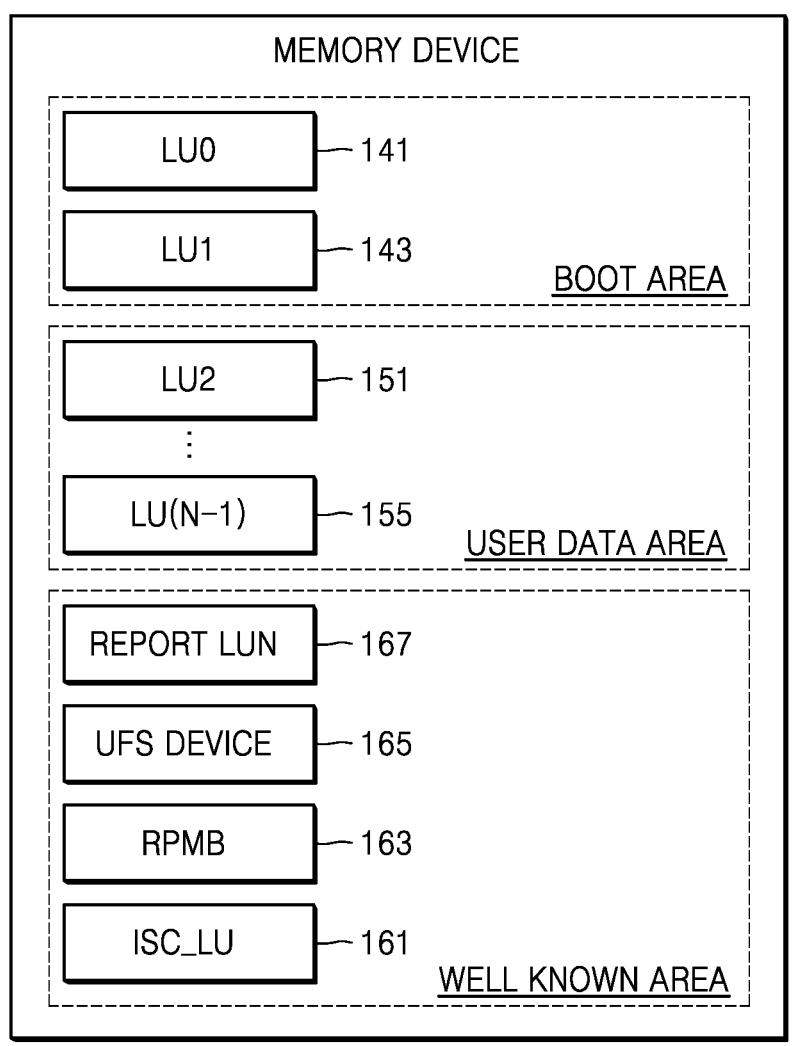
FIG. 2A is a block diagram illustrating a memory device according to an embodiment.

Hereinafter, embodiments will be described in detail with reference to the accompanying drawings.

FIG. 1 is a block diagram illustrating a memory system 10 according to an embodiment.

Referring to FIG. 1, the memory system 10 according to an embodiment may be an implementation embodiment of an electronic system including a memory which arbitrarily stores data to process, or stores processed data. For example, the memory system 10 may configure a computer, an ultra mobile personal computer (PC) (UMPC), a workstation, a net-book computer, a personal digital assistant (PDA), a portable computer, a web tablet, a tablet computer, a wireless phone, a mobile phone, a smartphone, an e-book, a portable multimedia player (PMP), a portable game machine, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage configuring a data sector, a device for transmitting or receiving information in a wireless environment, one of various electronic devices configuring a home network, one of various electronic devices configuring a computer network, one of various electronic devices configuring a telematics network, a radio frequency identification (RFID) device, or one of various electronic devices configuring a computing system.

The memory system 10 according to an embodiment may be mounted by using various types of packages. For example, the memory system 10 according to an embodiment may be mounted as a type such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline (SOIC), shrink small outline package (SSOP), thin small outline (TSOP), system in package (SIP), and multi-chip package.

The memory system 10 may include a storage device 100 and a host device 200. The host device 200 may request a memory operation from the storage device 100, and the storage device 100 may read, erase, or write data on the basis of the request and may provide a response as a result to the host device 200.

The storage device 100 may store data in a storage area. The storage area may denote an internal logical or physical storage area of the storage device 100 such as a sector, a page, and a block.

The storage device 100 may include one or more flash memory chips. In an embodiment, the storage device 100 may include a memory embedded into the host device 200. For example, the storage device 100 may include an embedded multimedia card (eMMC) or an embedded universal flash storage (UFS) memory device. In an embodiment, the storage device 100 may include an external memory which is detachably attached on the host device 200. For example, the storage device 100 may include an UFS memory card, compact flash (CF), secure digital (SD), micro secure digital (Micro-SD), mini secure digital (Mini-SD), extreme digital (xD), or a memory stick.

The storage device 100 may include a memory controller 110 and a memory device 130.

The memory controller 110 may overall control the storage device 100. For example, the memory controller 110 may schedule operations of the memory device 130, or may encode and decode signals/data obtained through processing by the storage device 100. In an embodiment, the memory controller 110 may control the memory device 130 so that the memory device 130 writes, reads, or erases data. For example, the memory controller 110 may control the memory device 130 to read data stored in the memory device 130 or to program data in the memory device 130, in response to a read request or a write response from the host device 200.

In an embodiment, the memory controller 110 may provide the memory device 130 with an address, a command, and a control signal, and thus, may control a program operation, a read operation, and an erase operation each performed on the memory device 130. Also, data for programming data, based on a request of the host device 200, in the memory device 130 and read data may be transmitted or received between the memory controller 110 and the memory device 130.

The memory controller 110 may include a core 111, a sub-memory 113, and a main memory 115.

The core 111 may process various operations for performing a memory operation on the memory device 130. According to an embodiment, the core 111 may decrypt a request from the host device 200 and may process various operations such as memory allocation, generating of a signal, and storing and calling of data for a memory operation (for example, a read operation, a write operation, or an erase operation) corresponding to the request.

The sub-memory 113 may aid data processing by the core 111. According to an embodiment, the sub-memory 113 may function as an internal buffer which arbitrarily stores data for enabling an operation processed by the core 111 to be quickly performed, or immediately maintains a processed operation.

According to an embodiment, the sub-memory 113 may include a tightly coupled memory (TCM) which is tightly coupled to the core 111. According to an embodiment, the sub-memory 113 may be slower in speed than a cache memory but may be directly coupled to the core 111, and thus, may adjust a data processing speed between the main memory 115 and the core 111. For example, the sub-memory 113 may support a high speed memory interface function.

According to an embodiment, the sub-memory 113 may include an instruction TCM (ITCM) and a data TCM (DTCM). For example, the ITCM may include a 64-bit bus and the DTCM may include a 32-bit bus, but the inventive concept is not limited thereto.

According to an embodiment, an address of the sub-memory 113 may be fixed, and thus, the core 111 may access the sub-memory 113 by using the same address. For example, the ITCM may use 0x0000000 as an address, and the DTCM may use 0x200000000 as an address. As the address of the sub-memory 113 is fixed, an access time to the sub-memory 113 may be constant. In an embodiment, the sub-memory 113 may be implemented as one chip.

In an embodiment, the sub-memory 113 may be implemented as a volatile memory such as static random access memory (SRAM) or dual-port SRAM, but is not limited thereto. The main memory 115 may load data stored in the memory device 130 and may provide data for processing by the core 111. In an embodiment, the memory controller 110 may patch load data, stored in the storage device 100, to the main memory 115 and may move data to the sub-memory 113 on the basis of a fetch operation performed on the core 111. Herein, the term "patch load" may denote an operation of loading data, stored in the memory device 130, to the main memory 115 of the memory controller 110 or an operation of loading the data, stored in the memory device 130, to the memory controller 110, and the term "fetch" may denote an operation of directly decrypting data previously loaded to a memory (for example, a cache memory, a TCM, etc.) adjacent to a core by using a main processing element (for example, the core 111). For example, the main memory 115 may include dynamic random access memory (DRAM) such as double data rate synchronous dynamic random access memory (DDR SDRAM), low power double data rate (LPDDR) SDRAM, graphics double data rate (GDDR) SDRAM, Rambus dynamic random access memory (RDRAM), DDR2 SDRAM, DDR3 SDRAM, DDR4 SDRAM, or DDR5 SDRAM, but is not limited thereto.

The memory device 130 may include a plurality of storage mediums for storing data on the basis of a request from the host device 200. In an embodiment, the memory device 130 may include a non-volatile memory device. In an embodiment, the memory device 130 may include a device to which various kinds of memories, such as NAND-type flash memory, magnetic RAM (MRAM), spin-transfer torque MRAM, conductive bridging RAM (CBRAM), ferroelectric RAM (FeRAM), phase RAM (PRAM), resistive RAM (RRAM), nano tube RAM, polymer RAM (PoRAM), nano floating gate memory (NFGM), holographic memory, molecular electronics memory), and insulator resistance change memory, are applied.

In an embodiment, the memory device 130 may include flash memory, and the flash memory may include a two-dimensional (2D) NAND memory array or a three-dimensional (3D) (or vertical) NAND (VNAND) memory array. A 3D memory array may be a circuit that includes arrays of memory cells including an active area disposed on a silicon substrate and is associated with an operation of each of the memory cells, and may be configured in a monolithic type on at least one physical level of a circuit which is provided on or in the substrate. The monolithic type may denote that layers of levels configuring the array are stacked just on layers of lower levels of the array. In an embodiment, the 3D memory array may include a plurality of vertical NAND strings which are arranged in a vertical direction in order for at least one memory cell to be disposed on another memory cell. The at least one memory cell may include a charge trap layer. U.S. Pat. Nos. 7,679,133, 8,553,466, 8,654,587 and 8,559,235 and U.S. Patent Application No. 2011/0233648 disclose appropriate elements of a 3D memory cell array which include a plurality of levels and in which word lines and/or bit lines are shared between the plurality of levels These reference documents are incorporated herein by reference in their entirety.

The memory device 130 may include a plurality of memory blocks, each of the plurality of memory blocks may include a plurality of pages, and each of the plurality of pages may include a plurality of memory cells connected to a word line. In an embodiment, the memory device 130 may include a plurality of planes including a plurality of memory blocks, and particularly, may include a plurality of memory dies respectively including a plurality of planes. According to an embodiment, the memory device 130 may perform a write operation or a read operation by page units, and an erase operation may be performed by block units.

The memory device 130 may include a boot area 140, a user data area 150, and a well-known area 160, which correspond to a logical unit (LU). Each of the boot area 140, the user data area 150, and the well-known area 160 may be implemented as at least one logical unit. The logical unit (LU) may be an independent function unit which processes a small computer system interface (SCSI) (a storage) task and designates an external address for performing an operation management function. For example, the logical unit (LU) may be used for storing a boot code, an application code, and a massive storage data application. The SCSI is an interface standard used for a peripheral device connection for a small computer.

The boot area 140 may include basic information needed for configuring a file system. The user data area 150 may substantially store data about a user. The well-known area 160 may include instructions for performing a certain function defined for an SCSI or UFS standard. The boot area 140, the user data area 150, and the well-known area 160 will be described in more detail in paragraphs corresponding to FIGS. 2A and 3B. According to an embodiment, the well-known area 160 may include an in-storage computing logical unit (ISC_LU) 161 which supports storage computing. According to an embodiment, the in-storage computing logical unit (ISC_LU) 161 may be a logical storage area and may support an internal buffer function for performing an arithmetic operation in the storage device 100 or may function as an internal memory.

According to an embodiment, the in-storage computing logical unit (ISC_LU) 161 may store a processing code. The processing code may include a code which is processed by the host device 200 and is written in a programming language for executing a task. The task may be a certain operation requested by a user. In an embodiment, compression, encryption, quantization, a matrix operation, floating point conversion, tree search, swap, repetition removal, pruning, rendering, or data mining may be requested as tasks.

In an embodiment, the processing code may be updated depending on the case. For example, the processing code may be updated to a latest algorithm, and thus, the efficiency of a task may be enhanced. In an embodiment, the processing code may be reprogrammed.

The storage device 100 according to an embodiment may store the processing code, provided from the host device 200, in the in-storage computing logical unit (ISC_LU) 161. The processing code may be patch loaded to the main memory 115 connected to the core 111, and then, may be fetched by the core 111. According to an embodiment, the processing code may be executed by the core 111, and thus, the storage device 100 may perform the task.

The memory device 130 may include a single level cell (SLC) which stores 1-bit data and a multi-level cell (MLC) which stores multi-bit data (for example, 2 or more bits). For example, the memory device 130 may include a triple level cell (TLC) for storing 3-bit data or a quadrature level cell (QLC) for storing 4-bit data, or may include a memory cell for storing 5 or more-bit data).

The memory controller 110 and the memory device 130 may transfer/receive an instruction, an address, and data through one or more channels. That an instruction transferred from the host device 200 is to be performed in a certain storage area of a memory device through a certain channel may be defined by a logical address or a logical block address (LBA) transferred from the host device 200.

The host device 200 may provide various services to a user of the host device 200 on the basis of operations of one or more electronic circuits, chips, and devices. According to an embodiment, the host device 200 may perform various operations for processing a task requested by the user and may provide a task result to the user. The host device 200 according to an embodiment may include an application.

Also, the host device 200 may include at least one operating system (OS), and the OS may overall manage and control a function and an operation of the host device 200 and may provide a mutual operation between the host device 200 and a user who uses the memory system 10. Here, the OS may support a function and an operation which correspond to the use purpose and usability of a user, and for example, may be classified into a general OS and a mobile OS on the basis of the mobility of the host device 200.

The general OS may be classified into a personal OS and an enterprise OS. For example, the personal OS may be a system which is specialized to support a service providing function for general users and may include Windows and Chrome, and the enterprise OS may be a system which is specialized to secure and support high performance and may include Windows server, Linux, and Unix. The mobile OS in the OS may be a system which is specialized to support a function of providing a mobile service to users and a power saving function of a system and may include android, iOS, and Windows mobile, for example. In an embodiment, the host device 200 may include a plurality of OSs and may also execute an OS for performing an operation with the memory system 10 corresponding to a user request. Here, a host may transfer a plurality of instructions, corresponding to a user request, to the memory system 10, and thus, the memory system 10 may perform operations (i.e., operations corresponding to a user request) corresponding to instructions.

The host device 200 according to an embodiment may include a UFS host control driver for supporting a UFS protocol. However, the inventive concept is not limited thereto, and the host device 200 may include a driver for supporting an embedded multimedia card (eMMC) protocol or a non-volatile memory express (NVMe) protocol.

The host device 200 may include a processor 210 and a host memory 230.

The processor 210 may control an overall operation of the host device 200, and in more detail, may control operations of the other elements configuring the host device 200. The main processor 1100 may be implemented as a general-use processor, a dedicated processor, or an application processor. In an embodiment, the processor 210 may be implemented as an operational processor (for example, a central processing unit (CPU), a graphics processing unit (GPU), an application processor (AP), etc.) including a dedicated logical circuit (for example, field programmable gate array (FPGA), application specific integrated circuit (ASIC), etc.), but is not limited thereto.

The host memory 230 may include a volatile memory or a non-volatile memory. For example, the host memory 230 may be a volatile memory and may include dynamic random access memory (DRAM) such as double data rate synchronous dynamic random access memory (DDR SDRAM), low power double data rate (LPDDR) SDRAM, graphics double data rate (GDDR) SDRAM, Rambus dynamic random access memory (RDRAM), DDR2 SDRAM, DDR3 SDRAM, DDR4 SDRAM, or DDR5 SDRAM. Also, the host memory 230 may be a non-volatile memory and may include a device to which various kinds of memories, such as NAND-type flash memory, magnetic RAM (MRAM), spin-transfer torque MRAM, conductive bridging RAM (CBRAM), ferroelectric RAM (FeRAM), phase RAM (PRAM), resistive RAM (RRAM), nano tube RAM, polymer RAM (PoRAM), nano floating gate memory (NFGM), holographic memory, molecular electronics memory), and insulator resistance change memory, are applied.

According to an embodiment, the host memory 230 may support a buffer function for processing data by using the processor 210. According to an embodiment, the host memory 230 may store a processing code for performing a task by using the processor 210. According to an embodiment, the host memory 230 may buffer a result based on a memory operation requested from the storage device 100.

According to an embodiment, the host memory 230 may store data in which is to be requested to be written in the storage device 100.

According to an embodiment, the processor 210 and the host memory 230 may be implemented as separate semiconductor chips. Alternatively, in an embodiment, the processor 210 and the host memory 230 may be integrated into the same semiconductor chip. For example, the processor 210 may be one of a plurality of modules included in an application processor, and the application processor may be implemented as a system on chip (SoC). Also, the host memory 230 may include an embedded memory included in the application processor, or may include a memory device or a memory module disposed outside the application processor.

The host device 200 may further include various devices associated with driving of the storage device 100. For example, the host device 200 may further include a software module such as a host application or a device driver, and the software module may be loaded to the host memory 230 and may be executed by the processor 210.

The storage device 100 and the host device 200 may communicate with each other through various kinds of interfaces. According to an embodiment, the storage device 100 and the host device 200 may be connected to each other a standard interface such as universal flash storage (UFS), advanced technology attachment (ATA), serial ATA (SATA), external SATA (e-SATA), small computer small interface (ISCS), or serial attached SCSI (SAS). Each of the host device 200 and the storage device 100 may generate a packet based on a protocol of an interface applied thereto and may transfer the packet. Furthermore, an interface for communication between the storage device 100 and the host device 200 may be applied to the memory system 10, and for example, may include various interfaces such as parallel advanced technology attachment (PATA), peripheral component interconnection (PCI), PCI-Express (PCI-E), IEEE 1394, universal serial bus (USB), secure digital (SD) card, multimedia card (MMC), embedded multimedia card (eMMC), compact flash (CF) card interface, enhanced small disk interface (ESDI), integrated drive electronics (IDE), and mobile industry processor interface (MIPI).

As machine learning is widely used and the size and amount of processed data increase, high computing performance and low power may be needed for the memory system 10. In order for the host device 200 to perform a task, the host device 200 may load the processing code, stored in the storage device 100, to the host memory 230, and the processor 210 may decrypt the loaded data. While data communication is being performed between the host device 200 and the storage device 100, the delay of a processing time and an overhead may occur, and the occurrence of heat and power consumption may be caused by interfacing between devices. For example, while data is being transferred from the memory device 130 to the host memory 230, processing may be delayed and power consumption may occur.

In the memory system 10 according to an embodiment, the storage device 100 may directly execute the processing code, and thus, an overhead and power consumption between the host device 200 and the storage device 100 may be reduced. Also, the memory system 10 according to an embodiment may use the computing performance of the storage device 100 having an idle status along with the host device 200, and thus, may perform the distribution and parallel processing of computing resources, thereby improving the overall performance of the memory system 10. Also, the memory system 10 according to an embodiment may reduce power and the occurrence of heat.

Figure 2B:
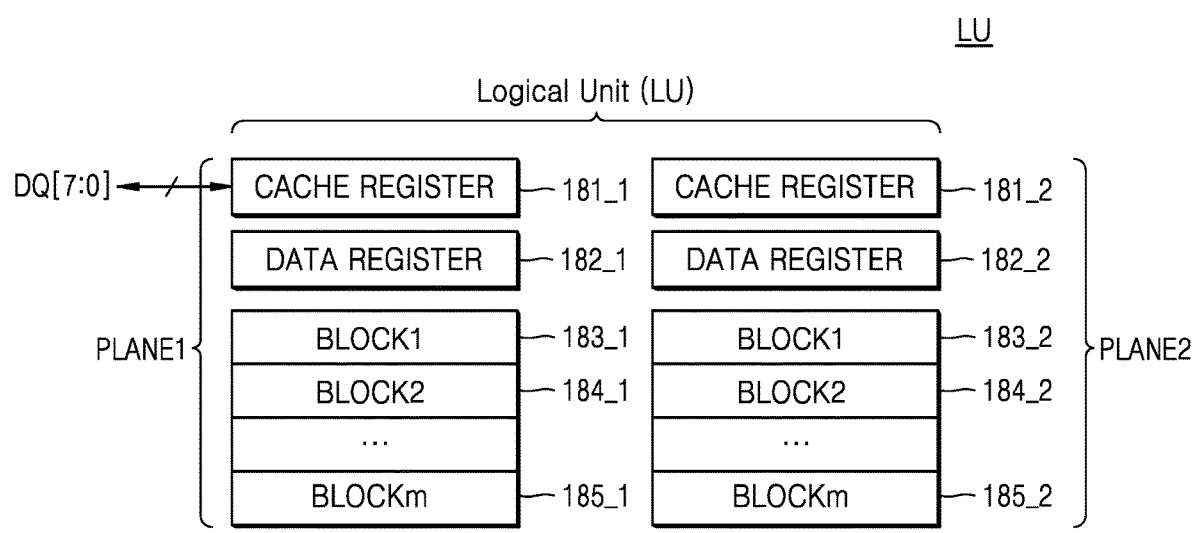
FIG. 2B is a block diagram illustrating a logical unit according to an embodiment.

FIG. 2A is a block diagram illustrating a memory device 130 according to an embodiment, and FIG. 2B is a block diagram illustrating a logical unit LU according to an embodiment. FIGS. 2A and 2B will be described in conjunction with FIG. 1.

Referring to FIG. 2A, the memory device 130 may include a boot area 140, a user data area 150, and a well-known area 160.

A logical unit (LU) may be an independent function unit which processes an SCSI task and designates an external address for performing an operation management function. For example, a logical unit (LU) may be used for storing a boot code, an application code, and a massive storage data application.

The memory device 130 may include the boot area 140, the user data area 150, and the well-known area 160, which correspond to a logical unit (LU). Each of the boot area 140, the user data area 150, and the well-known area 160 may include at least one logical unit (LU). However, the number of logical units illustrated in FIG. 2A is merely an example, and the number of logical units is not limited thereto.

The boot area 140 may include basic information needed for configuring a file system. In an embodiment, the boot area 140 may include information used for enabling the file system to access volume. For example, the boot area 140 may include a loader used by an OS which operates a memory system, and the boot area 140 may load a kernel file of the OS.

The boot area 140 may be allocated to a first block or a first block group of a partition of the memory device 130. In an embodiment, the boot area 140 may include a zeroth logical unit (LU0) 141 and a first logical unit (LU1) 143, and each of the zeroth logical unit (LU0) 141 and the first logical unit (LU1) 143 may include information used or needed for booting.

The user data area 150 may substantially store data of a user. According to an embodiment, the user data area 150 may store data which is requested to be stored in the storage device 100 through the host device 200. In an embodiment, the user data area 150 may include second to $(N-1)^{th}$ logical units (LU2 to LU(N-1)) 151 to 155. The second to $(N-1)^{th}$ logical units (LU2 to LU(N-1)) 151 to 155 may store user data.

The well-known area 160 may include instructions for a certain function defined for the SCSI or UFS standard. According to an embodiment, the well-known area 160 may include logical units such as a REPORT LUNS logical unit 167, a UFS Device logical unit 165, a BOOT logical unit 164, and a RPMB (replay protected memory block) logical unit 163, and each of the logical units may include instructions for providing a certain function. Each of the logical units of the well-known area 160 may include a well-known logical unit number (W-LUN). Well-known area 160 may also be described as a standard function area.

In an embodiment, the well-known area 160 may be defined to process only a certain instruction. For example, when an instruction other than a defined instruction is input to the well-known area 160, a response indicating "invalid instruction" may be output.

An in-storage computing logical unit (ISC_LU) 161 may store a processing code which is provided from the host device 200. According to an embodiment, the in-storage computing logical unit 161 may store the processing code so that a task is executed in a core (111 of FIG. 1) of a storage device (100 of FIG. 1). According to an embodiment, the processing code may be loaded to a sub-memory (113 of FIG. 1) by the in-storage computing logical unit 161, and then, may be fetched by the core 111.

According to an embodiment, the in-storage computing logical unit 161 may be provided in plurality based on the number of cores 111 of the storage device 100. According to an embodiment, when the number of cores 111 is k (where k is a natural number) number, the memory device 130 may include k in-storage computing logical units 161. According to an embodiment, when the storage device 100 includes a plurality of cores, each of the plurality of cores may fetch a processing code from a corresponding in-storage computing logical unit 161.

The RPMB logical unit 163 may prevent rewriting. The UFS Device logical unit 165 may support a cooperation between the host device 200 and the storage device 100, which are based on the UFS standard. The REPORT LUNS logical unit 167 may provide an inventory of a logical unit.

Referring to FIG. 2B, the logical units LU may include two planes (for example, first and second planes) PLANE1 and PLANE2.

The first plane PLANE1 may include a cache register 181_1, a data register 182_1, a first block 183_1, and second to $m^{th}$ blocks 184_1 to 185_1, and the second plane PLANE2 may include a cache register 181_2, a data register 182_2, a first block 183_2, and second to $m^{th}$ blocks 184_2 to 185_2.

The cache register 181_1 may manage data communication. In an embodiment, when a read operation is performed as a memory operation, the cache register 181_1 may receive data from the data register 182_1 and may provide the received data as data DQ, for example to data pins/terminals. In an embodiment, when a write operation is performed as a memory operation, the cache register 181_1 may provide data from the data DQ, for example from data pins/terminals, to the data register 182_1. For example, the number of pins connected to the data DQ may be 8, and the data DQ may transfer 8-bit data. For example, a size of the cache register 181_1 may be 2,048 bytes or 2,176 bytes including a preliminary space, but is not limited thereto.

The data register 182_1 may be controlled to process data by page units. In an embodiment, when the cache register 181_1 accesses the data register 182_1, the data register 182_1 may transfer data to the cache register 181_1, and thus, may allow a status of the data register 182_1 to be an accessible status and may receive data of a next page from each of the first to $m^{th}$ blocks 183_1 to 185_1. For example, a size of the cache register 181_1 may be 2,048 bytes or 2,176 bytes including a preliminary space, but is not limited thereto.

Each of the first to $m^{th}$ blocks 183_1 to 185_1 may include a plurality of pages (where m is a natural number which is more than 1).

Each element of the second plane PLANE2 may provide a function similar to each element of the first plane PLANE1 described above, and thus, repetitive descriptions are omitted. Each plane may be independent and equal, but may interleave an address of a memory. For example, an odd-numbered memory may be allocated to the first plane PLANE1, and an even-numbered memory may be allocated to the second plane PLANE2.

In an embodiment, a size of one page may be 2,048 bytes or 2,176 bytes including a preliminary space, but is not limited thereto. For example, one block may include 64 pages, but is not limited thereto. For example, the number of blocks included in the first plane PLANE1 may be 1,024, but is not limited thereto. One logical unit LU may include two planes, and thus, according to a assigned numerical value, one logical unit LU may be 2,176 megabytes (Mb).

In FIG. 2B, for convenience of description, it is illustrated that two planes configure the logical unit LU, but the inventive concept is not limited thereto.

According to an embodiment, one memory die may include a cache register 181_1 or 182_1, a data register 182_1 or 182_2, and first to $m^{th}$ blocks 183_1 to 185_1 or 183_2 to 185_2. According to an embodiment, a memory die included in the memory device (130 of FIG. 2A) may include one or more planes PLANE1 or PLANE2.

According to an embodiment, like the illustration of FIG. 2B, a logical unit LU may be configured as a set of one or more planes PLANE1 or PLANE2 included in one memory die. For example, one memory die may include at least one logical unit LU. For example, one memory die may be 8 gigabytes (Gb), the first logical unit LU0 (141 of FIG. 2A) may be 1 Gb, the second logical unit LU1 (143 of FIG. 2A) may be 2 Gb, and another 4 Gb may be allocated to a user data area (150 of FIG. 2A) and a well-known area (160 of FIG. 2A).

According to an embodiment, unlike the illustration of FIG. 2, a logical unit LU may be configured as a set of one or more memory dies. For example, a logical unit LU may include two or more memory dies, and thus, the logical unit LU may include a plurality of planes. For example, one memory die may be 8 Gb, and the first logical unit (LU0) 141 may be a set of two memory dies and may be set to 16 Gb.

According to an embodiment, a logical unit LU is not limited to the type of a memory die and the number of planes included in the memory die, and may be various combinations and may be a unit of data processing.

Figure 3A:
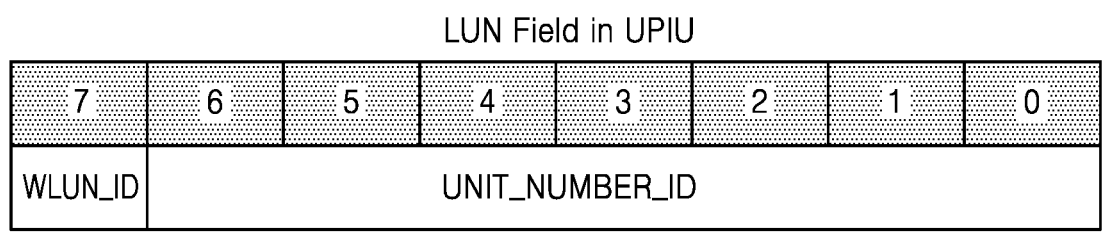

FIGS. 3A and 3B are tables showing a well-known area according to an embodiment.

Referring to FIG. 3A, a logical unit LU may have an extensible address, process an SCSI task independently, and execute a task management function. The logical unit LU may be independent from another logical unit LU. A UFS may support a certain number of logical units specialized to bMaxNumberLU. The logical unit LU may store a boot code, an application code, and a massive storage data application. Each of logical units of the well-known area 160 may include a well-known logical unit number (W-LUN).

According to an embodiment, a logical unit number (LUN) field of 8 bits may be included in a UFS protocol information unit (UPIU). The UPIU may be an exchange unit in an UFS transport protocol (UTP) layer between an UFS host device and an UFS storage device. The LUN field of 8 bits may provide an LUN or the W-LUN.

In an embodiment, a bit "0" or "1" may be allocated to or a WLUN_ID which is a most significant bit (MSB (i.e., a seventh bit)) of the LUN field. For example, when the most significant bit (MSB) of the LUN field corresponds to a logical unit other than a well-known logical unit, the WLUN_ID may be set to "0", and when the most significant bit (MSB) of the LUN field corresponds to a well-known logical unit, the WLUN_ID may be set to "1". According to an embodiment, when a most significant bit of the LUN field is checked, the type of logical unit may be determined.

In an embodiment, an LUN value or a W-LUN value may be set in a UNIT NUMBER ID which corresponds to residual bits (i.e., zeroth to sixth bits). According to an embodiment, when residual bits other than the most significant bit of the LUN field are checked, a unique number of a logical unit may be determined. For example, the LUN value or the W-LUN value may be greater than or equal to 0 and less than or equal to 127, but is not limited thereto.

Referring to FIG. 3B, logical units (for example, a REPORT LUNS logical unit (167 of FIG. 2A), a UFS Device logical unit (165 of FIG. 2A), a Boot logical unit, and a RPMB logical unit (163 of FIG. 2A) defined in a well-known area 160 will be described.

The REPORT LUNS logical unit 167 may be defined in an SCSI primary commands (SPC) and may provide an inventory of a logical unit. A REPORT LUNS instruction may allow an application client to issue a request to receive certain information associated with a memory system.

The UFS Device logical unit 165 may support a cooperation of a device level. For example, the well-known area 160 may support a cooperation such as the control of a power mode and device wiping.

The Boot logical unit may provide virtual reference for a real logical unit including a boot code, on the basis of designation of the host device 200. The Boot logical unit may be read when a system starts to operate for accessing the boot code.

The RPMB logical unit 163 may use an independent process thereof and a memory space on the basis of definition of RPMB security, and thus, may provide an RPMB function.

An example, where a W-LUN and an LUN field of logical units defined in the well-known area 160 correspond to the REPORT LUNS logical unit 167, will be described below. The W-LUN of the REPORT LUNS logical unit 167 may be set to a hexadecimal number "01h (hexadeca)", and the LUN field may be set to a hexadecimal number "81h". According to an embodiment, a hexadecimal number "81h" of the LUN field may be a binary number "1000_0001". Referring to bit allocation to an LUN field in FIG. 3A, a most significant bit (MSB) of an LUN field of the REPORT LUNS logical unit 167 may be "1", and thus, a UFS storage device may determine information about "well-known logical unit".

According to an embodiment, a storage device (100 of FIG. 1) may be a well-known logical area and may include an in-storage computing logical unit (161 of FIG. 1). According to an embodiment, an LUN of the in-storage computing logical unit 161 may be set to a hexadecimal number "B8h". However, this is merely an embodiment, and the LUN of the in-storage computing logical unit 161 may be set to various hexadecimal numbers where a most significant bit of a binary number is "1".

According to an embodiment, the in-storage computing logical unit 161 may be provided in plurality based on the number of cores 111 of the storage device 100. In this case, an LUN of each of a plurality of in-storage computing logical units may be set to "B8h", "B9h", and "BAh" so as to be equal to the number of cores 111.

Figure 4:
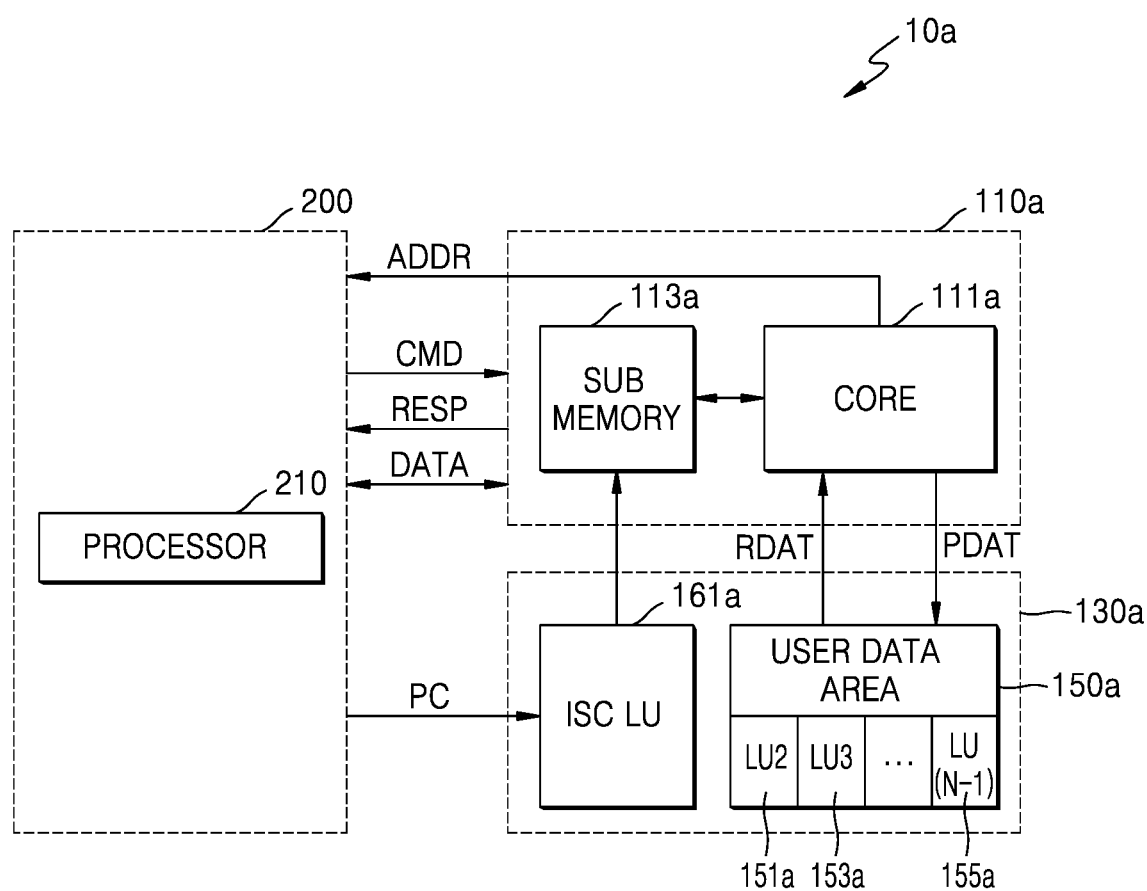
FIG. 4 is a block diagram illustrating a memory system according to an embodiment.

FIG. 4 is a block diagram illustrating a memory system 10a according to an embodiment. FIG. 4 may be an example of implementation of the memory system 10 of FIG. 1. FIG. 4 will be described in conjunction with FIG. 1.

Referring to FIG. 4, the memory system 10a may include a memory controller 110a, a memory device 130a, and a host device 200. The memory controller 110a may include a core 111a and a sub-memory 113a, the memory device 130a may include a user data area 150a and an in-storage computing logical unit 161a, and the host device 200 may include a processor 210. The processor 210, the sub-memory 113a, the core 111a, and the in-storage computing logical unit 161a, and the user data area 150a may respectively provide functions similar to the processor 210, the sub-memory 113, the core 111, and the in-storage computing logical unit 161, and the user data area 150 each described above with reference to FIG. 1, and repetitive descriptions are omitted.

In an embodiment, the host device 200 may provide a command CMD to the memory controller 110*a*, and as a result thereof, may receive a response RESP. Also, the host device 200 may provide data DATA to the memory controller 110*a*. In an embodiment, for convenience of description, it is described that the data DATA is provided to the memory controller 110*a*, but it may be understood that the data DATA is directly provided to the memory device 130*a* and is provided to a memory cell array (not shown) through a page buffer.

According to an embodiment, when the memory controller 110*a* is in an idle status where the memory device 130*a* does not perform a memory operation (for example, a read operation, a write operation, or an erase operation), the computing performance of the core 111*a* included in the memory controller 110*a* may be used. Instead of an arithmetic operation performed in the host device 200, an arithmetic operation in a storage device storing data may be referred to as in-storage computing (ISC). Also, an operation where a task is not performed in the processor 210 of the host device 200 but is performed in a processing device disposed at a position relatively close to a memory space storing data may be referred to as near-data processing (NDP). According to an embodiment, the core 111*a* of the memory controller 110*a* may distribute and process some of tasks of the host device 200, and thus, ISC or NDP may be performed.

According to an embodiment, the host device 200 may provide a processing code PC to the in-storage computing logical unit 161*a*. The processing code PC may include a program code which executes a task needed for the host device 200. For example, the processing code PC may include a code which is written in a programming language for compression, encryption, quantization, a matrix operation, floating point conversion, tree search, swap, repetition removal, pruning, rendering, or data mining. According to an embodiment, a task which does not need real-time processing or needs a massive repetition operation may be suitable for NDP. However, a task is not limited to the processing described above and may denote various execution operations requiring the computing performance of the memory system 10*a*. Also, the processing code PC may be updated based on the improvement of an algorithm, and the updated processing code may be stored in the in-storage computing logical unit 161*a* again. In an embodiment, reprogramming of the processing code PC may be performed.

According to an embodiment, the host device 200 may encrypt and provide the processing code PC. According to an embodiment, the host device 200 may request a public key from the memory controller 110*a*, and the memory controller 110*a* may determine an encryption method and may provide the host device 200 with the public key based on the determined encryption method. The host device 200 may provide the processing code PC on the basis of the public key. In an embodiment, a public key encryption method may use an encryption method such as a Rivest-Shamir-Adleman (RSA) encryption method or a digital signature algorithm (DSA) encryption method, but is not limited thereto and various encryption methods may be applied to the inventive concept.

According to an embodiment, the memory controller 110*a* may verify an encrypted process code obtained through encryption based on the public key, on the basis of a private key. In an embodiment, the memory controller 110*a* may compare hash values based on the private key to determine whether the processing code PC is provided from an authenticated host device 200. When verification succeeds, the memory controller 110*a* may store the processing code PC in the in-storage computing logical unit 161*a*.

According to an embodiment, the host device 200 may provide the storage device with a description including the size, number, and activation or not of the in-storage computing logical unit 161*a*. The storage device may allocate the size and number of the in-storage computing logical unit 161*a* on the basis of a request of the host device 200 and may set the activation or not of the in-storage computing logical unit 161*a*. For example, the host device 200 may request a size of a computing logical unit LU on the basis of the number of cores 111*a* included in the memory controller 110*a*. For example, when there are a plurality of cores, the host device 200 may differently allocate and activate the computing logical unit LU to each core so as to differently perform a task.

According to an embodiment, the host device 200 may check a status of the memory controller 110*a*. The memory controller 110*a* may provide the host device 200 with information which includes the number of cores, the manufacturer, serial number, and type of each core, an address of a TCM, a size of the TCM, the number of logical units included in the well-known area 160.

According to an embodiment, when the memory controller 110*a* is in an idle status where a memory operation is not performed, the memory controller 110*a* may load the processing code PC to the in-storage computing logical unit 161*a* on the basis of an activation request of the host device 200. In an embodiment, the memory controller 110*a* may load the processing code PC from the in-storage computing logical unit 161*a* to the sub-memory 113*a*.

The user data area 150*a* may include a second logical unit 151*a*, a third logical unit 153, and an $(N-1)^{th}$ logical unit 155*a*. In order to perform a task, target data which is input by a user or is previously stored may need to be read from a memory. In an embodiment, the target data which is to be read from the memory may be defined as read data RDAT. The memory device 130*a* may store the read data RDAT in one of the second, third, and $(N-1)^{th}$ logical units 151*a*, 153*a*, and 155*a* of the user data area 150*a*. For example, the second logical unit 151*a* may store the read data RDAT.

According to an embodiment, based on the activation request of the host device 200, the core 111*a* may fetch the processing code PC loaded to the sub-memory 113*a* and may receive the read data RDAT from the user data area 150*a*.

According to an embodiment, the core 111*a* may perform a task by using the read data RDAT on the basis of an execution request of the host device 200. A task result, which is a task execution result of the core 111*a*, may be stored in the user data area 150*a* again. In an embodiment, the task result stored in a logical unit of the user data area 150*a* may be defined as program data PDAT. According to an embodiment, the task may be executed in the core 111*a*, and the program data PDAT which is a result thereof may be stored in one of the second, third, and $(N-1)^{th}$ logical units 151*a*, 153*a*, and 155*a* of the user data area 150*a*. For example, the third logical unit 153*a* may store the program data PDAT.

According to an embodiment, the core 111*a* may store the program data PDAT in the memory device 130*a*, and thus, all of the task result may not be provided to the host device 200. According to an embodiment, the core 111*a* may provide the host device 200 with only an address ADDR of the program data PDAT stored in the memory device 130a.

According to an embodiment, the memory system 10a may perform the distribution and parallelization of computing resources by using ISC (or NDP). Also, the memory system 10a according to an embodiment may decrease power consumption and a delay time and may increase a processing speed.

Figure 5:
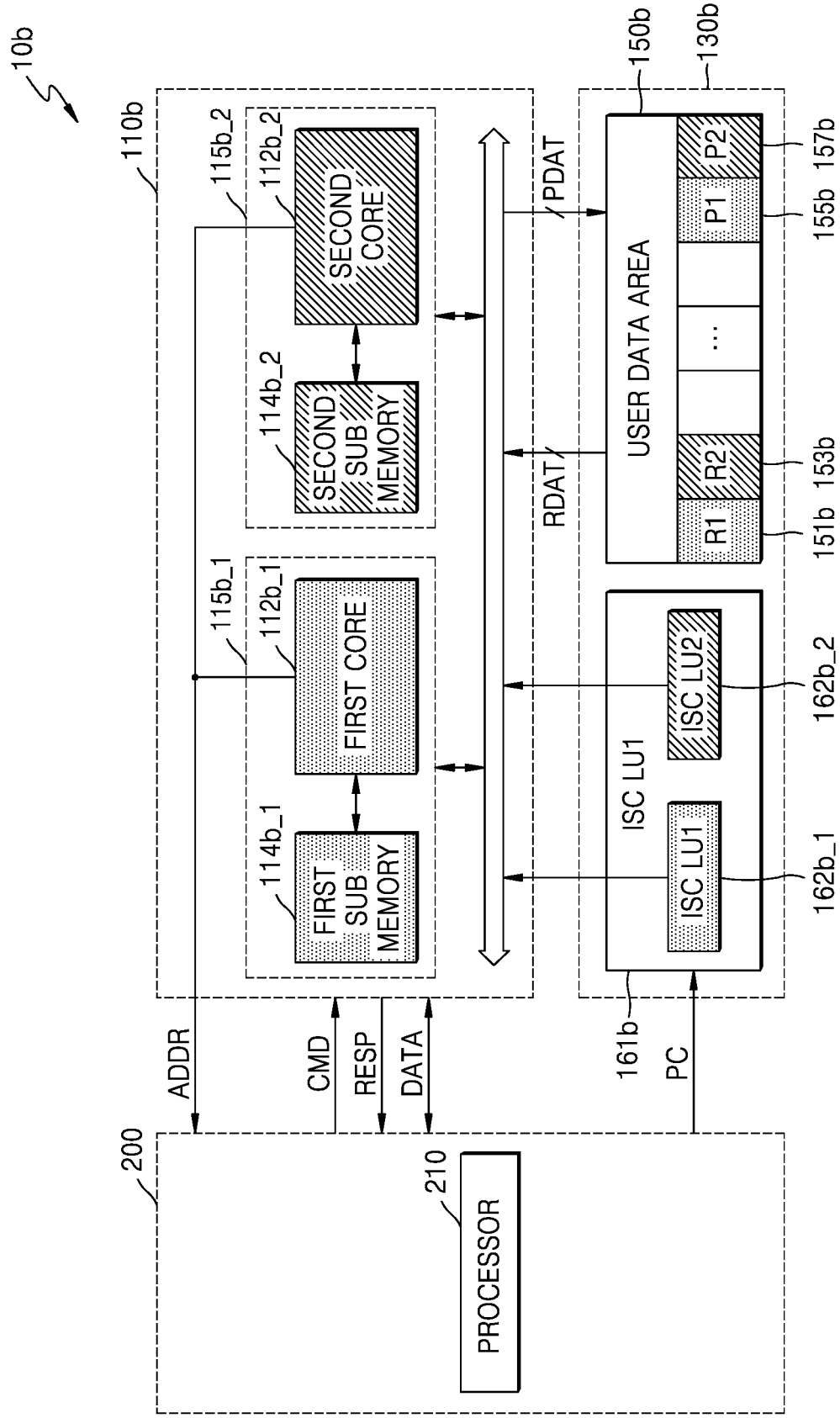
FIG. 5 is a block diagram illustrating a memory system according to an embodiment.

In FIG. 4, address ADDR, command CMD, response RESP, and data DATA communication between the host device 200 and the memory controller 110a and processing code PC communication between the host device 200 and the in-storage computing logical unit 161a conceptually illustrate a signal transmitted between both sides, and it may not be construed that a separate physical signal line is needed for communication of each signal. This may be the same as a description of FIG. 5 given below. A physical signal line for communication between the host device 200 and a storage device (100 of FIG. 1) including the memory controller 110a and the in-storage computing logical unit 161a will be described below in more detail with reference to FIG. 19.

FIG. 5 is a block diagram illustrating a memory system 10b according to an embodiment. FIG. 5 may be an example of implementation of the memory system 10 of FIG. 1. FIG. 5 will be described in conjunction with FIGS. 1 and 4.

Referring to FIG. 5, the memory system 10b may include a memory controller 110b, a memory device 130b, and a host device 200. The memory controller 110b may include a first core 112b_1, a second core 112b_2, a first sub-memory 114b_1, and a second sub-memory 114b_2, the memory device 130b may include a user data area 150b and an in-storage computing logical unit 161b, and the in-storage computing logical unit 161b may include a first in-storage computing logical unit 162b_1 and a second in-storage computing logical unit 162b_2. The host device 200 may include a processor 210. The processor 210, the first and second sub-memories 114b_1 and 114b_2, the first and second cores 112b_1 and 112b_2, the first and second in-storage computing logical units 162b_1 and 162b_2, and the user data area 150b may respectively provide functions similar to the processor 210, the sub-memory 113a, the core 111a, and the in-storage computing logical unit 161a, and the user data area 150a each described above with reference to FIG. 4, and repetitive descriptions are omitted.

The memory controller 110b may include a plurality of cores and a plurality of sub-memories as a memory tightly coupled to a core. In an embodiment, the memory controller 110 may include a first core 112b_1, a first sub-memory 114b_1 tightly coupled to the first core 112b_1, a second core 112b_2, and a second sub-memory 114b_2 tightly coupled to the second core 112b_2. The first core 112b_1 and the first sub-memory 114b_1 tightly coupled to the first core 112b_1 may be referred to as a first processing unit 115b_1, and the second core 112b_2 and the second sub-memory 114b_2 tightly coupled to the second core 112b_2 may be referred to as a second processing unit 115b_2.

Each of the first core 112b_1 and the second core 112b_2 may function as a dedicated core for executing each of a plurality of tasks requested by the host device 200. According to an embodiment, the first core 112b_1 may be specialized for processing a first task of the plurality of tasks or may mainly process the first task, and the second core 112b_2 may be specialized for processing a second task of the plurality of tasks or may mainly process the second task. For example, the first core 112b_1 may mainly process compression, and the second core 112b_2 may mainly process a floating point operation. In FIG. 5, each of a core and a sub-memory is illustrated as two, but this is for convenience of description and each of a plurality of cores and sub-memories may be provided in the memory controller 110b.

The in-storage computing logical unit 161b may include a plurality of logical units equal to the number of cores. According to an embodiment, as two cores are provided, the first in-storage computing logical unit 162b_1 and the second in-storage computing logical unit 162b_2 may be provided. The first in-storage computing logical unit 162b_1 may store a processing code for executing a first task, and the second in-storage computing logical unit 162b_2 may store a processing code for executing a second task. For example, the first in-storage computing logical unit 162b_1 may store a processing code for compression, and the second in-storage computing logical unit 162b_2 may store a processing code for a floating point operation.

According to an embodiment, the host device 200 may provide a processing code PC to each of the first in-storage computing logical unit 162b_1 and the second in-storage computing logical unit 162b_2. The processing code PC may include a processing code for the first task and a processing code for the second task. The memory device 130b may decode processing where hash verification has succeeded and may store a processing code for a task corresponding to each of the first in-storage computing logical unit 162b_1 and the second in-storage computing logical unit 162b_2.

According to an embodiment, the first processing unit 115b_1 may load the processing code for the first task in the first in-storage computing logical unit 162b_1. In an embodiment, the first sub-memory 114b_1 may load the processing code for the first task, and the first core 112b_1 may fetch the processing code for the first task and may load first read data in a first read area (R1) 151b, thereby performing the first task. A task result may be stored in a first program area (P1) 155b. In an embodiment, the second sub-memory 114b_2 may load the processing code for the second task, and the second core 112b_2 may fetch the processing code for the second task and may load second read data in a second read area (R2) 153b, thereby performing the second task. A task result may be stored in a second program area (P2) 157b.

The processing code for the first task, the processing code for the second task, the first read data, the second read data, first program data, and second program data may use a bus for communication.

The first core 112b_1 may provide the host device 200 with an address of data stored in the first program area 155b based on an execution result of the first task, and the second core 112b_2 may provide the host device 200 with an address of data stored in the second program area 157b based on an execution result of the second task.

Figure 6:
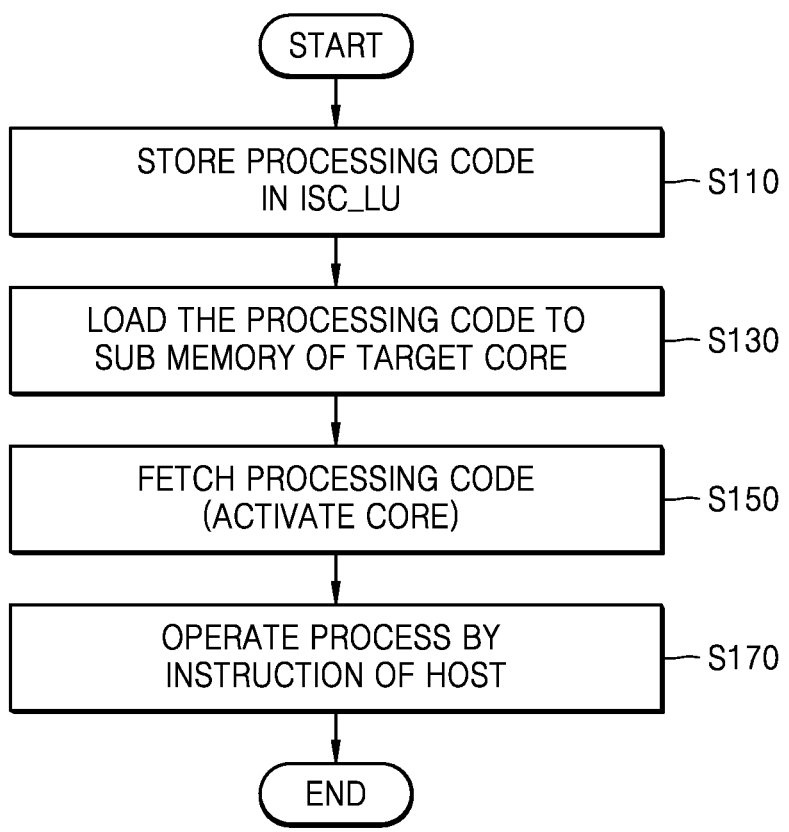
FIG. 6 is a flowchart illustrating an operating method of a storage device according to an embodiment.

FIG. 6 is a flowchart illustrating an operating method of a storage device 100 according to an embodiment. FIG. 6 will be described in conjunction with FIGS. 1 and 4.

In operation S110, a processing code PC is stored in an in-storage computing logical unit ISC_LU. According to an embodiment, a host device (200 of FIG. 1) may store a processing code (PC of FIG. 4), which is for executing a task, in an in-storage computing logical unit 161. According to an embodiment, a memory controller (110 of FIG. 1) may verify an encrypted processing code by using a hash value and may store a processing code, on which verification has succeeded, in the in-storage computing logical unit 161.

In operation S130, when there are a plurality of cores, a processing code is loaded to a sub-memory which is a memory tightly coupled to a target core to execute a task among a plurality of cores. According to an embodiment, a processing code PC may be loaded to a sub-memory (113 of FIG. 1) tightly coupled to a target core which is a core (111 of FIG. 1) to execute a task. In an embodiment, the target core 111 may be in an idle status where a memory operation is not processed.

In operation S150, the processing code PC is fetched. According to an embodiment, the target core 111 may fetch the processing code PC. Operation S150, operation S130, or operation S150 may be referred to as an operation. The activation of a core may denote that ready-for-execution of a task is completed.

In operation S170, the core executes the processing code PC on the basis of an execution request of a host, and a task is executed. According to an embodiment, the core 111 may refer to read data (RDAT of FIG. 4) included in a user data area (150 of FIG. 1), and thus, may execute the task.

FIGS. 7A and 7B are tables showing a configuration of each of a response and an instruction according to an embodiment. FIGS. 7A and 7B will be described in conjunction with FIG. 1

A UFS protocol information unit (UPIU) may be an exchange unit in a UFS transport protocol (UTP) between a host device based on the UFS standard and a storage device based on the UFS standard. In an embodiment, the host device (200 of FIG. 1) and the storage device (100 of FIG. 1) may exchange information through a command UPIU and a response UPIU.

Referring to FIG. 7A, the command UPIU transferred to the storage device 100 by the host device 200 based on the UFS standard may consist of 32 areas, and each of the 32 areas may be 1 byte. In an embodiment, the type, or kind, of a command may be checked by decoding a command description block (CDB) consisting of 16 bytes from a sixteenth area to a thirty-first area. According to an embodiment, when a most significant bit (MSB) of an LUN allocated to a second area is 1, a well-known logical unit may be determined, and when 0, a general logical unit may be determined.

Referring to FIG. 7B, a response UPIU transferred from the storage device 100 based on the UFS standard to the host device 200 based on the UFS standard may consist of 32 bytes. The response UPIU may return whether the command UPIU is normally received, based on writing a value, corresponding to "Task Tag" which is a third area of the command UPIU, in the third area. Also, according to an embodiment, when the command UPIU is normally processed, a "Response" of a sixth area and a "Status" value of a seventh area may be returned to 0. When all of a bit value of the sixth area and a bit value of the seventh area are 0, the transfer of the command UPIU may denote success.

The command UPIU and the response UPIU may be respectively queued. For example, the command UPIU and the response UPIU may respectively queue 64 commands or responses. As queuing is possible, a plurality of commands and/or responses may be transferred and processed simultaneously or at a time.

Figure 8:
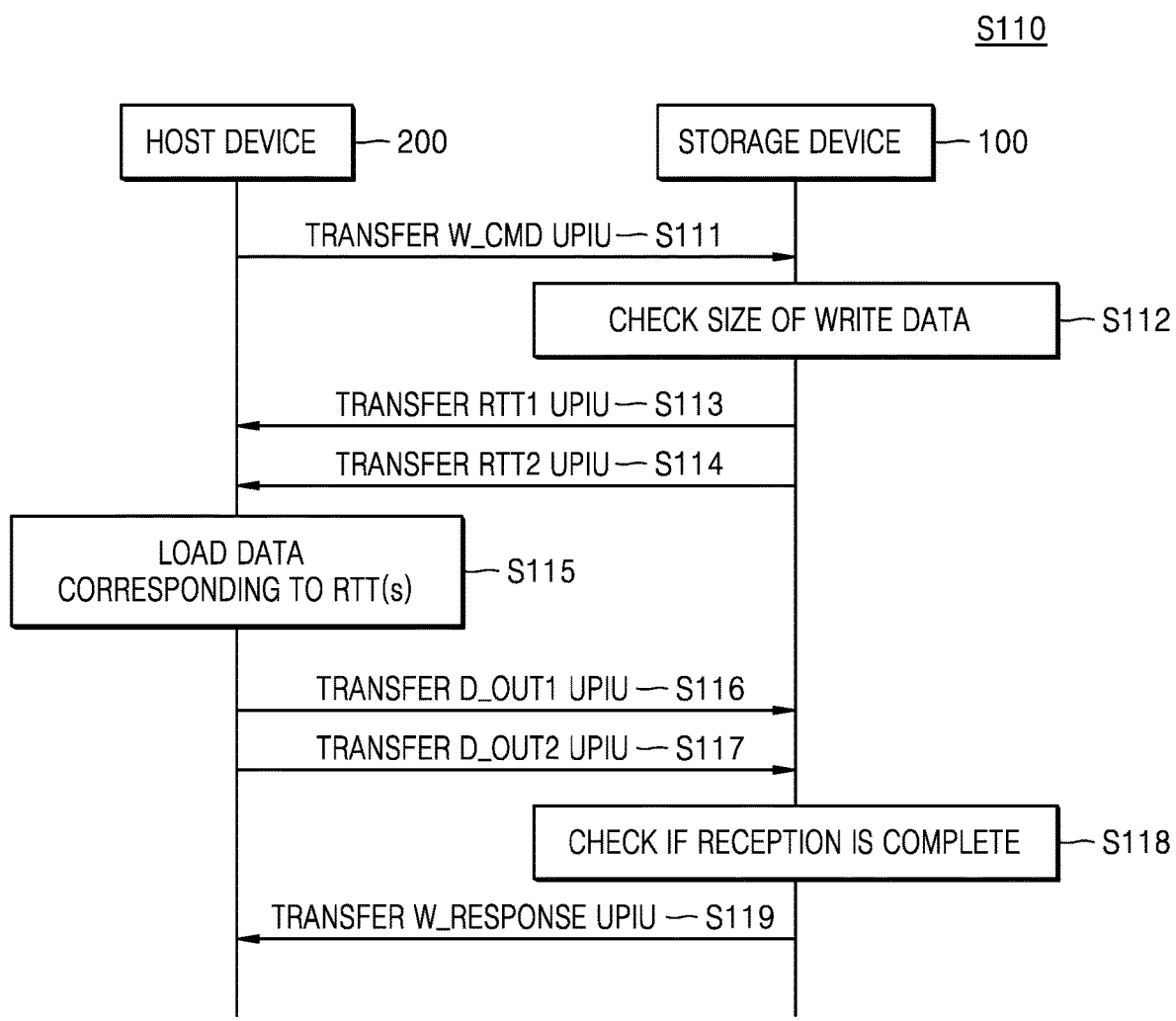
FIG. 8 is a flowchart illustrating in detail an operating method of a memory system according to an embodiment.

FIG. 8 is a flowchart illustrating in detail an operating method of a memory system according to an embodiment. FIG. 8 will be described in conjunction with FIGS. 1 and 4. FIG. 8 illustrates in detail operation S110 of FIG. 6. FIGS. 8 to 11 further include a description of the host device 200 other than the storage device 100, for an overall description of a memory system (10 of FIG. 1).

In operation S111, the host device 200 transfers a write command (W_CMD) UPIU to the storage device 100.

In operation S112, the storage device 100 checks a size of data which is to be written, based on the write command UPIU. According to an embodiment, the write command UPIU may include size information about a processing code (PC of FIG. 4). An in-storage computing logical unit (161 of FIG. 1) included in the storage device 100 may be limited in size of a storage space. When a size of the processing code PC is greater than that of the in-storage computing logical unit 161, the storage device 100 according to an embodiment may respond to segment the size of the processing code PC by a size of the in-storage computing logical unit 161 and to divisionally receive the processing code PC a plurality of times.

In operation S113, the storage device 100 transfers first ready-to-transfer (RTT) UPIU (RTT1 UPIU) to the host device 200, and in operation S114, the storage device 100 may transfer second RTT UPIU (RTT2 UPIU) to the host device 200. According to an embodiment, the storage device 100 may check the size of the processing code PC which is data to be written, and when the size of the processing code PC is greater than the in-storage computing logical unit 161, the storage device 100 may perform processing so that the processing code PC is divided into two codes and received.

In operation S115, the host device 200 segments and loads data (i.e., a processing code) by the number of RTT UPIUs. The host device 200 may segment the processing code PC to correspond to the size of the in-storage computing logical unit 161.

In operation S116, the host device 200 transfers a first data output UPIU (D_OUT1 UPIU). In operation S117, the host device 200 may transfer a second data output UPIU (D_OUT2 UPIU). The first data output UPIU (D_OUT1 UPIU) and the second data output UPIU (D_OUT2 UPIU) may each include the processing code PC.

In operation S118, the storage device 100 checks whether reception is completed. In an embodiment, the storage device 100 may recognize the number of transferred RTT UPIUs as a result of operation S112, and thus, may check whether a number of data output UPIUs equal to a number corresponding thereto are received.

In operation S119, when the total reception of the processing code PC is completed, a write response (W RESPONSE) UPIU is transferred to the host device 200.

Figure 9:
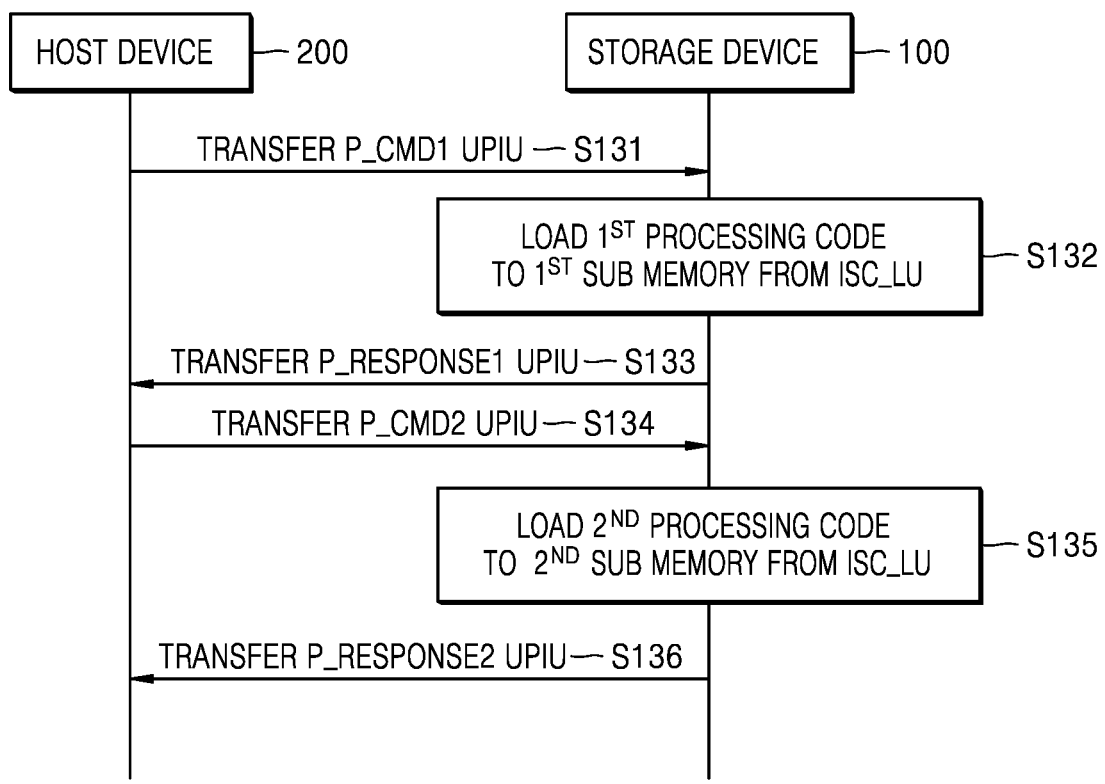
FIG. 9 is a flowchart illustrating in detail an operating method of a memory system according to an embodiment.

FIG. 9 is a flowchart illustrating in detail an operating method of a memory system according to an embodiment. FIG. 9 illustrates in detail operation S130 of FIG. 6. FIG. 9 will be described in conjunction with FIGS. 1 and 4.

In operation S131, a first patch load command (P_CMD1) UPIU is transferred to the storage device 100. In an embodiment, when the storage device 100 is in an idle status where a memory operation is not performed, the host device 200 may issue or transfer the first patch load command P_CMD1.

In operation S132, a processing code stored in an in-storage computing logical unit 161 is loaded to a sub-memory tightly coupled to a core. According to an embodiment, the storage device 100 may fetch a first processing code, stored in the in-storage computing logical unit 161, to a first sub-memory 113.

In operation S133, a first patch load response (P_RESPONSE1) UPIU is transferred. According to an embodiment, as a patch loading operation is completed, the storage device 100 transfers the first patch load response P_RESPONSE1 to the host device 200.

In operation S134, a first patch load command (P_CMD2) UPIU is transferred to the storage device 100. In an embodiment, the storage device 100 may include a plurality of cores and the plurality of cores may respectively perform different tasks, and thus, a number of patch load commands equal to the number of tasks may be issued.

In operation S135, a processing code stored in the in-storage computing logical unit 161 is loaded to a sub-memory tightly coupled to a core. According to an embodiment, the storage device 100 may load a second processing code, stored in the in-storage computing logical unit 161, to a second sub-memory 113.

In operation S136, a second patch load response (P_RESPONSE2) UPIU may be transferred. According to an embodiment, as the patch loading operation is completed, the storage device 100 may transfer the second patch load response P_RESPONSE2 to the host device 200.

Figure 10:
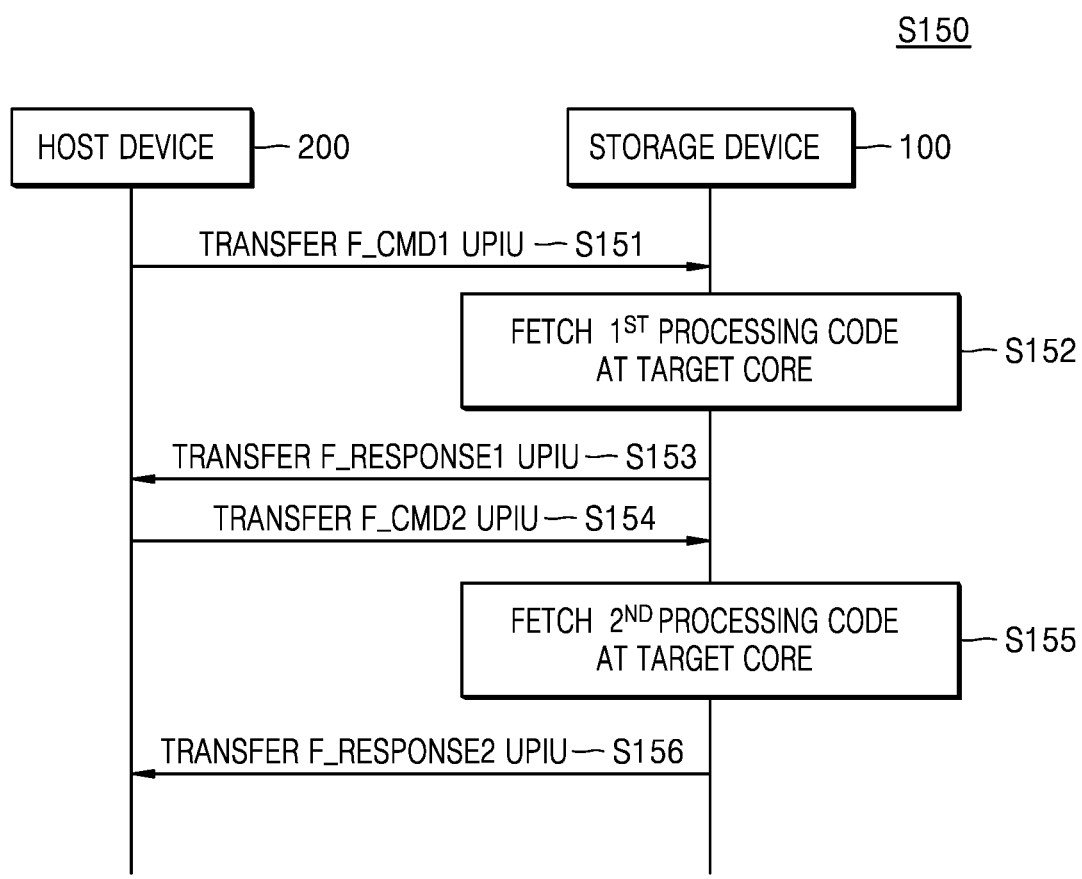
FIG. 10 is a flowchart illustrating in detail an operating method of a memory system according to an embodiment.

FIG. 10 is a flowchart illustrating in detail an operating method of a memory system according to an embodiment. FIG. 10 illustrates in detail operation S150 of FIG. 6. FIG. 10 will be described in conjunction with FIGS. 1 and 4.

In operation S151, a first fetch load command (F_CMD1) UPIU is transferred to the storage device 100. In an embodiment, when the storage device 100 is in an idle status where a memory operation is not performed, the host device 200 may issue or transfer the first fetch load command F_CMD1.

In operation S152, a processing code PC loaded to a sub-memory is fetched in a target core 111, by which a task is to be processed, of one or more cores. According an embodiment, the target core 111 may fetch a first processing code stored in the first sub-memory 113.

In operation S153, a first fetch response (F_RESPONSE1) UPIU is transferred. According to an embodiment, as a fetch operation is completed, the storage device 100 transfers the first fetch response F_RESPONSE1 to the host device 200.

In operation S154, a second patch load command (P_CMD2) UPIU may be transferred. In an embodiment, the storage device 100 may include a plurality of cores and the plurality of cores may respectively perform different tasks, and thus, a number of fetch commands equal to the number of tasks may be issued.

In operation S155, the processing code PC loaded to the sub-memory may be fetched in a target core 111, by which a task is to be processed, of one or more cores. According an embodiment, each of a plurality of cores may be activated, and thus, a target core for performing a fetch operation may differ each time. According an embodiment, the target core 111 may fetch a second processing code stored in the second sub-memory 113.

In operation S156, a second fetch response (F_RESPONSE2) UPIU may be transferred. According to an embodiment, as a fetch operation is completed, the storage device 100 may transfer the second fetch response F_RESPONSE2 to the host device 200.

Figure 11:
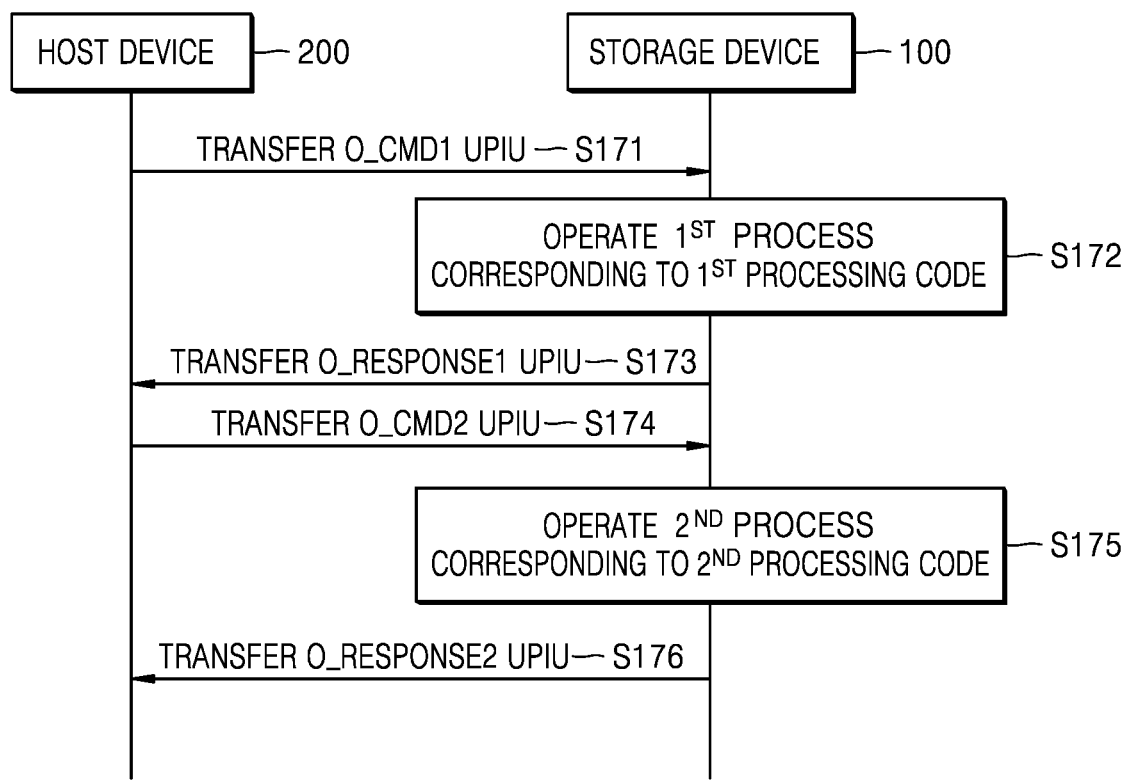
FIG. 11 is a flowchart illustrating in detail an operating method of a memory system according to an embodiment.

FIG. 11 is a flowchart illustrating in detail an operating method of a memory system according to an embodiment. FIG. 11 illustrates in detail operation S170 of FIG. 6. FIG. 11 will be described in conjunction with FIGS. 1 and 4.

In operation S171, a first execution command (O_CMD1) UPIU is transferred to the storage device 100. In an embodiment, the host device 200 may issue and transfer the first execution command O_CMD1 to the storage device 100.

In operation S172, processing of a first task corresponding to a first processing code is performed. According an embodiment, the first processing code may be associated with performing of the first task.

In operation S173, a first execution response (O_RESPONSE1) UPIU is transferred. According to an embodiment, as an execution operation is completed, the storage device 100 may transfer the first execution response O_RESPONSE1 to the host device 200.

In operation S174, a second patch load command (P_CMD2) UPIU may be transferred to the storage device 100. In an embodiment, the storage device 100 may include a plurality of cores and the plurality of cores may respectively perform different tasks, and thus, a number of execution commands equal to the number of tasks may be issued.

In operation S175, processing of a second task corresponding to a second processing code may be executed. According to an embodiment, the second processing code may be associated with performing of the second task and may be independent from the first task.

In operation S176, a second execution response (O_RESPONSE2) UPIU may be transferred. According to an embodiment, as an execution operation is completed, the storage device 100 may transfer the second execution response O_RESPONSE2 to the host device 200. The second execution response O_RESPONSE2 may be provided along with an address at which a result of the second task based on second execution is stored.

Figure 12:
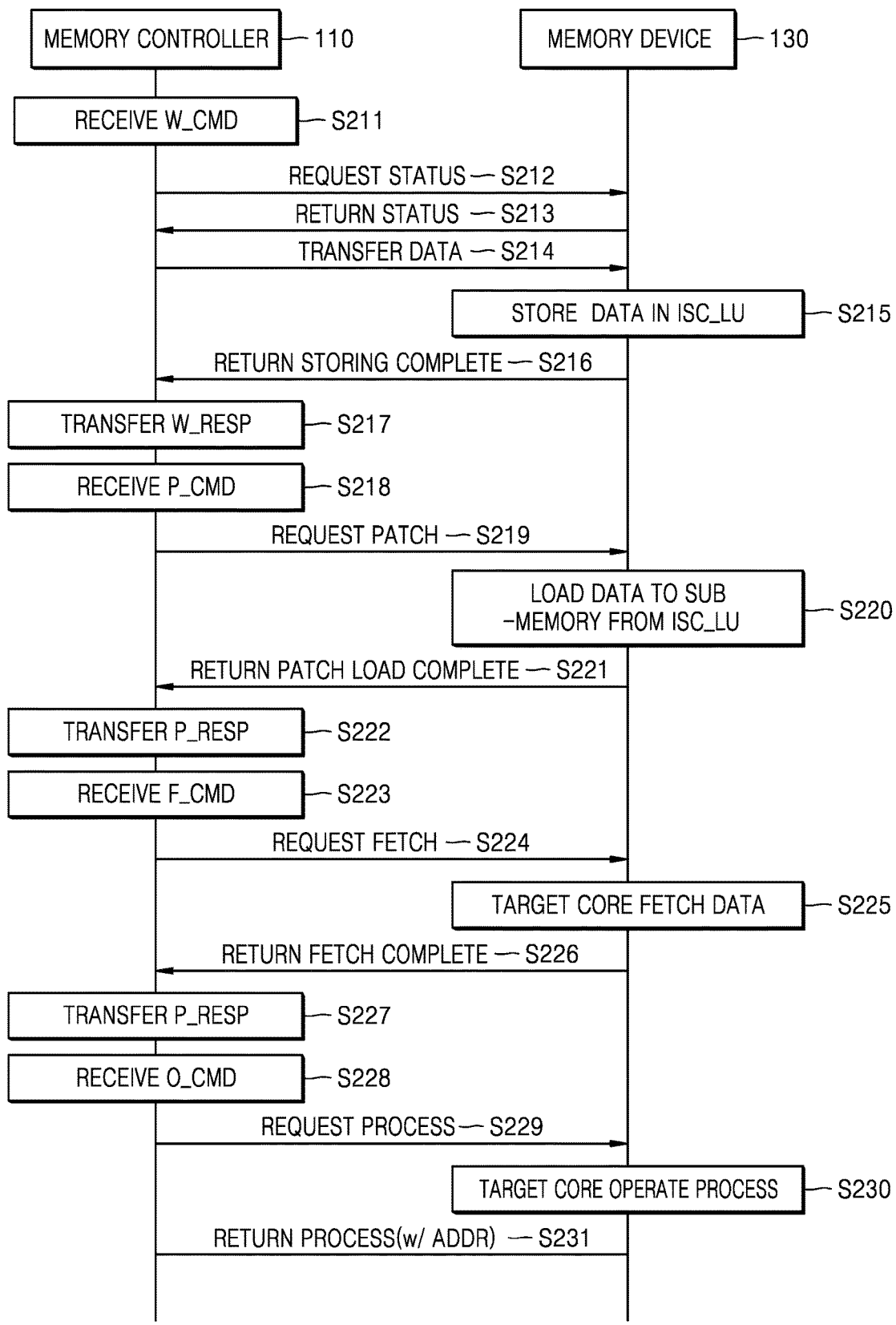
FIG. 12 is a flowchart illustrating in detail an operating method of a storage device according to an embodiment.

FIG. 12 is a flowchart illustrating in detail an operating method of a storage device according to an embodiment.

Referring to FIG. 12 in conjunction with FIG. 1, in operation S211, the memory controller 110 receives a write command W_CMD. According to an embodiment, the write command W_CMD may be transferred from the host device 200 to the storage device 100 including the memory controller 110.

In operation S212, the memory controller 110 requests status information STATUS. In an embodiment, the status information STATUS may include, for example, the number of cores, the manufacturer, serial number, and type of each core, an address of a TCM, a size of the TCM, or the number of logical units included in the well-known area 160. In operation S213, the memory device 130 returns the status information STATUS.

In operation S214, data is transferred. According to an embodiment, the memory controller 110 may provide the memory device 130 with data corresponding to a processing code PC on the basis of the status information STATUS.

In operation S215, the memory device 130 stores data, corresponding to the processing code PC, in the in-storage computing logical unit (ISC_LU) 161. According to an embodiment, the data provided to the memory device 130 may be data on which encryption hash verification by the memory controller 110 has succeeded.

In operation S216, storage completion information is returned. According to an embodiment, the memory device 130 may receive the segmentation and transfer of a processing code PC, store each of segmented processing codes in a logic unit, and check the completion of storage.

In operation S217, the memory controller 110 provides a write response W_RESP to the host device 200.

In operation S218, the memory controller 110 receives a patch load command P_CMD. In an embodiment, the patch load command P_CMD may be included in a command UPIU provided from the host device 200. In operation S219, the memory controller 110 requests a patch loading operation from the memory device 130. In operation S210, the memory device 130 loads data, corresponding to the processing code PC, from an in-storage computing logical unit to a sub-memory. In operation S221, the memory device 130 returns patch completion information. In operation S222, the memory controller 110 provides a patch load response P RESP to the host device 200.

In operation S223, the memory controller 110 receives a fetch command F_CMD. In an embodiment, the fetch command F_CMD may be included in a command UFIU provided from the host device 200. In operation S224, the memory controller 110 requests a fetch operation from the memory device 130. In operation S225, the memory device 130 fetches the data, corresponding to the processing code PC, from the sub-memory. In operation S226, the memory device 130 returns fetch completion information. In operation S227, the memory controller 110 provides a fetch response F_RESF to the host device 200.

In operation S228, the memory controller 110 receives an execution command O_CMD. In an embodiment, the execution command O_CMD may be included in a command UOIU provided from the host device 200. In operation S229, the memory controller 110 requests an execution operation from the memory device 130. In operation S230, the memory device 130 executes an operation based on the data, corresponding to the processing code PC, from the sub-memory. In operation S231, the memory device 130 returns execution completion information. In an embodiment, the memory device 130 may provide the memory controller 110 with an address at which a task result is stored, and the address at which the task result is stored may be provided to the host device 200.

Figure 13:
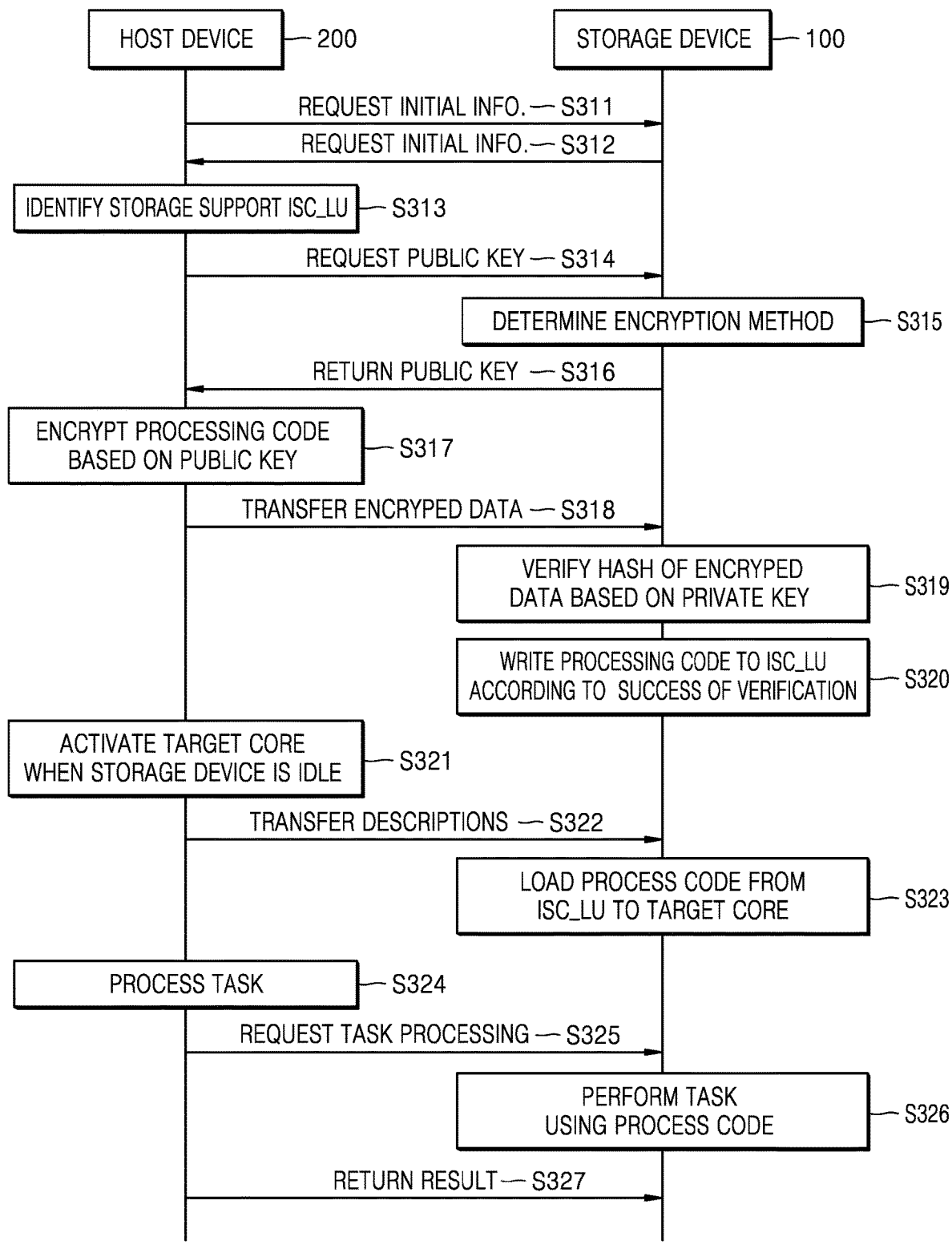
FIG. 13 is a flowchart illustrating in detail an operating method of a memory system according to an embodiment.

FIG. 13 is a flowchart illustrating in detail an operating method of a memory system according to an embodiment.

In operation S311, initial information is requested. According to an embodiment, the host device 200 may request status information STATUS about the storage device 100. In an embodiment, the status information STATUS may include, for example, the number of cores, the manufacturer, serial number, and type of each core, an address of a TCM, a size of the TCM, or the number of logical units included in the well-known area 160. In operation S312, the storage device 100 may return the status information STATUS.

In operation S313, the host device 200 checks whether the storage device 100 supports the in-storage computing logical unit (ISC_LU) 161. When the storage device 100 does not support the in-storage computing logical unit (ISC_LU), a series of operations for ISC is not performed.

In operation S314, the host device 200 requests a public key from the storage device 100. In operation S315, the storage device 100 determines an encryption method. The encryption method may use various public key-based encryption methods such as the RSA encryption method and the DSA encryption method. In operation S316, the storage device 100 provides the host device 200 with a public key based on the determined encryption method.

In operation S317, the storage device 200 encrypts a processing code PC for a task by using a public key. In operation S318, the host device 200 transfers encrypted data to the storage device 100. In an embodiment, the encrypted data may be data which is obtained by encrypting the processing code PC on the basis of the public key.

In operation S319, the storage device 100 verifies a hash value of encrypted data on the basis of a private key. In operation S320, based on verification success, the storage device 100 decrypts the encrypted data and may store a processing code, obtained through the decryption, in the in-storage computing logical unit (ISC_LU) 161.

In operation S321, the host device 200 activates a target core on the basis of an idle status of the storage device 100. In an embodiment, the activation of a core may include an operation of fetching a processing code to a memory tightly coupled to the core and an operation of fetching the processing code by using the core.

In operation S322, the host device 200 transfers a description to the storage device 100. According to an embodiment, the description may include the size, number, and activation or not of the in-storage computing logical unit 161.

In operation S323, the storage device 100 loads the processing code PC, stored in the in-storage computing logical unit 161, to the target core. In an embodiment, as the target core fetches the processing code PC, the processing code PC may be ready to execute.

In operation S324, the host device 200 starts to process the task. In operation S325, the processing of the task is requested. In operation S326, the storage device 100 performs the task by using the processing code PC. In operation S327, a task result obtained by performing the task is stored in the storage device 100, and an address of stored data may be provided to the host device 200.

FIG. 14 is a table showing a configuration of a command according to an embodiment.

Referring to FIG. 14, a configuration of a vendor command is classified and shown. According to an embodiment, an operation code (OPCODE) of the vendor command may be defined as a hexadecimal number "C0h".

A first byte area [0] of CDB denotes the vendor command, and a value thereof may be a hexadecimal number "C0". A second byte area [1] of the CDB is a code value for differentiating the kinds of some of various vendor commands. For example, the second byte area [1] of the CDB may check a status of a certain portion of a storage device, or may provide conventional vendor functions which are to be provided to the host device 200.

According to an embodiment, the in-storage computing logical unit 161 may be associated with a VENDOR OPERATION CODE portion corresponding to the second byte area [1] of the CDB. For example, a processing code may be stored in the in-storage computing logical unit 161, or an activation command may be issued to execute the stored processing code.

Figure 15:
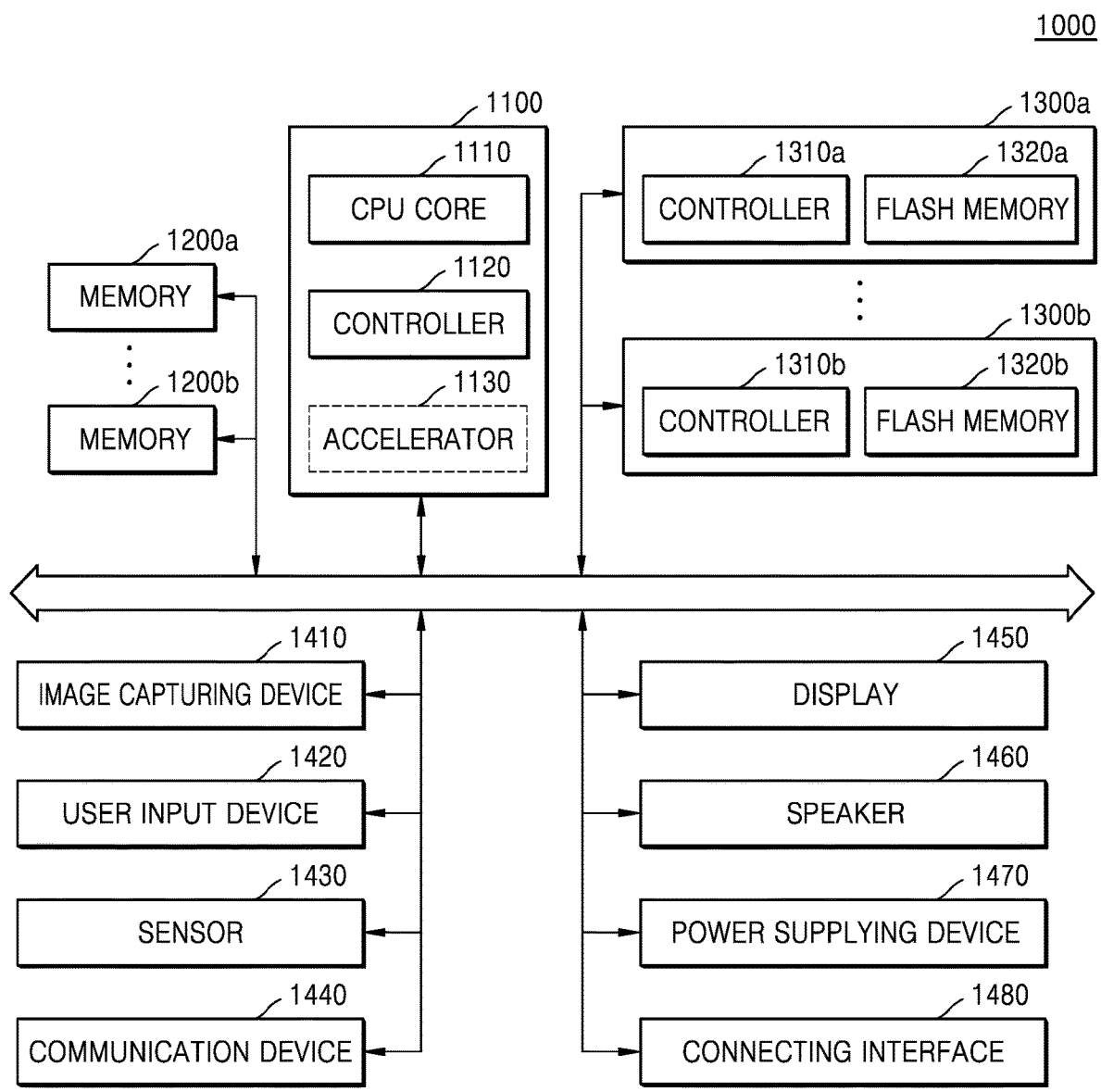
FIG. 15 is a block diagram illustrating a system to which a storage device according to an embodiment is applied.

FIG. 15 is a block diagram illustrating a system 1000 to which a storage device 100 according to an embodiment is applied.

The memory system 10 of FIG. 1 may be applied to FIG. 15. The system 1000 of FIG. 15 may basically be a mobile system, such as a portable communication terminal (e.g., a mobile phone), a smartphone, a tablet personal computer (PC), a wearable device, a healthcare device, or an Internet of things (IOT) device. However, the system 1000 of FIG. 15 is not necessarily limited to the mobile system and may be a PC, a laptop computer, a server, a media player, or an automotive device (e.g., a navigation device).

Referring to FIG. 15, the system 1000 may include a main processor 1100, memories (e.g., 1200a and 1200b), and storage devices (e.g., 1300a and 1300b). In addition, the system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control all operations of the system 1000, more specifically, operations of other components included in the system 1000. The main processor 1100 may be implemented as a general-purpose processor, a dedicated processor, or an application processor.

The main processor 1100 may include at least one CPU core 1110 and further include a controller 1120 configured to control the memories 1200a and 1200b and/or the storage devices 1300a and 1300b. In some embodiments, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU) and be implemented as a chip that is physically separate from the other components of the main processor 1100.

The memories 1200a and 1200b may be used as main memory devices of the system 1000. Although each of the memories 1200a and 1200b may include a volatile memory, such as static random access memory (SRAM) and/or dynamic RAM (DRAM), each of the memories 1200a and 1200b may include non-volatile memory, such as a flash memory, phase-change RAM (PRAM) and/or resistive RAM (RRAM). The memories 1200a and 1200b may be implemented in the same package as the main processor 1100.

The storage devices 1300a and 1300b may serve as non-volatile storage devices configured to store data regardless of whether power is supplied thereto, and have larger storage capacity than the memories 1200a and 1200b. The storage devices 1300a and 1300b may respectively include storage controllers (STRG CTRL) 1310a and 1310b and NVM (Non-Volatile Memory)s 1320a and 1320b configured to store data via the control of the storage controllers 1310a and 1310b. Although the NVMs 1320a and 1320b may include V-NAND flash memories having a two-dimensional (2D) structure or a three-dimensional (3D) structure, the NVMs 1320a and 1320b may include other types of NVMs, such as PRAM and/or RRAM.

The storage devices 1300a and 1300b may be physically separated from the main processor 1100 and included in the system 1000 or implemented in the same package as the main processor 1100. In addition, the storage devices 1300a and 1300b may have types of solid-state devices (SSDs) or memory cards and be removably combined with other components of the system 100 through an interface, such as the connecting interface 1480 that will be described below. The storage devices 1300a and 1300b may be devices to which a standard protocol, such as a universal flash storage (UFS), an embedded multi-media card (eMMC), or an NVM express (NVMe), is applied, without being limited thereto.

The image capturing device 1410 may capture still images or moving images. The image capturing device 1410 may include a camera, a camcorder, and/or a webcam.

The user input device 1420 may receive various types of data input by a user of the system 1000 and include a touch pad, a keypad, a keyboard, a mouse, and a microphone.

The sensor 1430 may detect various types of physical quantities, which may be obtained from the outside of the system 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include an antenna, a transceiver, or a modem.

The display 1450 and the speaker 1460 may serve as output devices configured to respectively output visual information and auditory information to the user of the system 1000.

The power supplying device 1470 may appropriately convert power supplied from a battery (not shown) embedded in the system 1000 and/or an external power source, and supply the converted power to each of components of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

Figure 16:
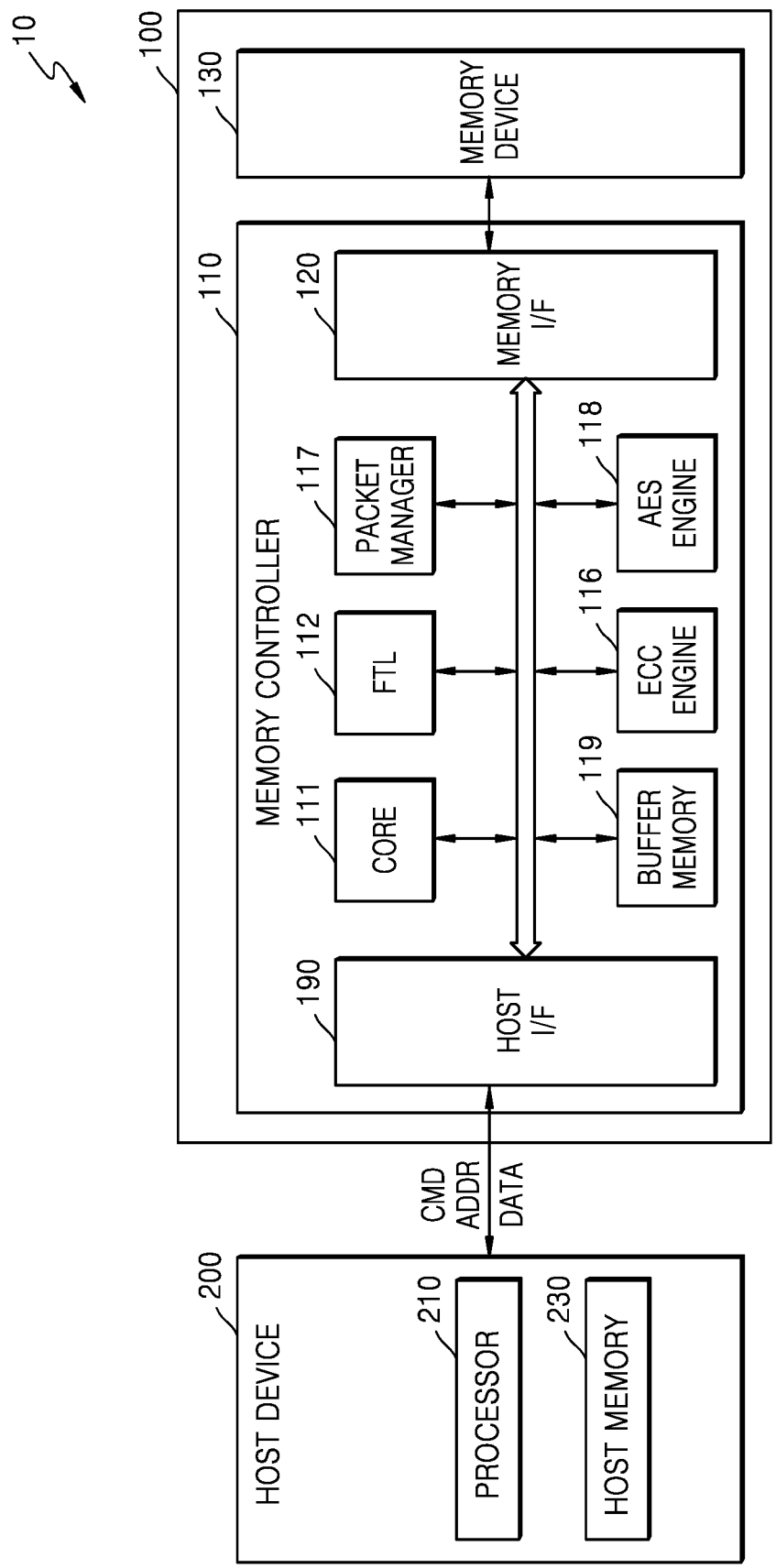
FIG. 16 is a block diagram illustrating a memory system according to an embodiment.

FIG. 16 is a block diagram illustrating a memory system 10 according to an embodiment. The above description of the memory system 10 of FIG. 1 may be applied within a range which differs from the following description of FIG. 16.

FIG. 16 is a block diagram of a memory system 10 according to an example embodiment.

The memory system 10 may include a host device 200 and a storage device 100. Further, the storage device 100 may include a memory controller 110 and a memory device 130. According to an example embodiment, the host device 200 may include a processor 210 and a host memory 230. The host memory 230 may serve as a buffer memory configured to temporarily store data to be transmitted to the storage device 100 or data received from the storage device 100.

The storage device 100 may include storage media configured to store data in response to requests from the host device 200. As an example, the storage device 100 may include at least one of an SSD, an embedded memory, and a removable external memory. When the storage device 100 is an SSD, the storage device 100 may be a device that conforms to an NVMe standard. When the storage device 100 is an embedded memory or an external memory, the storage device 100 may be a device that conforms to a UFS standard or an eMMC standard. Each of the host device 200 and the storage device 100 may generate a packet according to an adopted standard protocol and transmit the packet.

When the memory device 130 of the storage device 100 includes a flash memory, the flash memory may include a 2D NAND memory array or a 3D (or vertical) NAND (VNAND) memory array. As another example, the storage device 100 may include various other kinds of NVMs. For example, the storage device 100 may include magnetic RAM (MRAM), spin-transfer torque MRAM, conductive bridging RAM (CBRAM), ferroelectric RAM (FRAM), PRAM, RRAM, and various other kinds of memories.

According to an embodiment, the processor 210 and the host memory 230 may be implemented as separate semiconductor chips. Alternatively, in some embodiments, the processor 210 and the host memory 230 may be integrated in the same semiconductor chip. As an example, the processor 210 may be any one of a plurality of modules included in an application processor (AP). The AP may be implemented as a System on Chip (SoC). Further, the host memory 230 may be an embedded memory included in the AP or an NVM or memory module located outside the AP.

The processor 210 may manage an operation of storing data (e.g., write data) of a buffer region of the host memory 230 in the memory device 130 or an operation of storing data (e.g., read data) of the memory device 130 in the buffer region.

The memory controller 110 may include a host interface 190, a memory interface 120, and a CORE 111. Further, the storage controllers 110 may further include a flash translation layer (FTL) 112, a packet manager 117, a buffer memory 119, an error correction code (ECC) engine 116, and an advanced encryption standard (AES) engine 118. The storage controllers 110 may further include a working memory (not shown) in which the FTL 112 is loaded. The CORE 111 may execute the FTL 112 to control data write and read operations on the memory device 130.

The host interface 190 may transmit and receive packets to and from the host device 200. A packet transmitted from the host device 200 to the host interface 190 may include a command or data to be written to the memory device 130. A packet transmitted from the host interface 190 to the host device 200 may include a response to the command or data read from the memory device 130. The memory interface 120 may transmit data to be written to the memory device 130 to the memory device 130 or receive data read from the MEMORY DEVICE 130. The memory interface 120 may be configured to comply with a standard protocol, such as Toggle or open NAND flash interface (ONFI).

The FTL 112 may perform various functions, such as an address mapping operation, a wear-leveling operation, and a garbage collection operation. The address mapping operation may be an operation of converting a logical address received from the host device 200 into a physical address used to actually store data in the memory device 130. The wear-leveling operation may be a technique for preventing excessive deterioration of a specific block by allowing blocks of the memory device 130 to be uniformly used. As an example, the wear-leveling operation may be implemented using a firmware technique that balances erase counts of physical blocks. The garbage collection operation may be a technique for ensuring usable capacity in the memory device 130 by erasing an existing block after copying valid data of the existing block to a new block.

The packet manager 117 may generate a packet according to a protocol of an interface, which consents to the host device 200, or parse various types of information from the packet received from the host device 200. In addition, the buffer memory 119 may temporarily store data to be written to the memory device 130 or data to be read from the memory device 130. Although the buffer memory 119 may be a component included in the storage controllers 110, the buffer memory 119 may be outside the storage controllers 110.

The ECC engine 116 may perform error detection and correction operations on read data read from the memory device 130. More specifically, the ECC engine 116 may generate parity bits for write data to be written to the memory device 130, and the generated parity bits may be stored in the memory device 130 together with write data. During the reading of data from the memory device 130, the ECC engine 116 may correct an error in the read data by using the parity bits read from the memory device 130 along with the read data, and output error-corrected read data.

The AES engine 118 may perform at least one of an encryption operation and a decryption operation on data input to the storage controllers 110 by using a symmetric-key algorithm.

Figure 17:
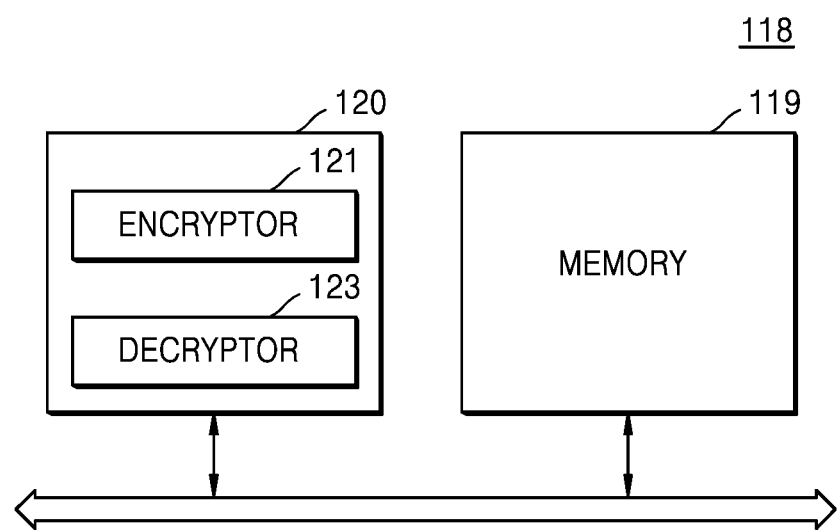
FIG. 17 is a block diagram illustrating in detail an advanced encryption standard (AES) engine of FIG. 16 according to an embodiment.

FIG. 17 is a detailed diagram of the AES engine 118 of FIG. 2A. The AES engine 118 may encrypt and decrypt data by using an AES algorithm and include an encryptor 121 and a decryptor 123. Although FIG. 17 illustrates a case in which the encryptor 121 and the decryptor 123 are implemented as separate modules, in another case, one module capable of performing both encryption and decryption operations may be implemented in the AES engine 118. A memory 119 may be a volatile memory serving as a buffer or be an NVM.

The AES engine 118 may receive first data transmitted from the memory 119. The encryptor 121 may encrypt the first data, which is transmitted from the memory 119, by using an encryption key and generate second data. The second data may be transmitted from the AES engine 118 to the memory 119, and be stored in the memory 119.

In addition, the AES engine 118 may receive third data transmitted from the memory 119. The third data may be data that is encrypted with the same encryption key as an encryption key used to encrypt the first data. The decryptor 123 may decrypt the third data, which is transmitted from the memory 119, with the same encryption key as the encryption key used to encrypt the first data and generate fourth data. The fourth data may be transmitted from the AES engine 118 to the memory 119, and be stored in the memory 119. The various components, such as encryptors, decryptors, the different engines, and other blocks or modules described herein, may be implemented using hardware, for example paired with software or firmware, that are collectively configured to carry out the methods and processes described in connection with the components being described.

Figure 18:
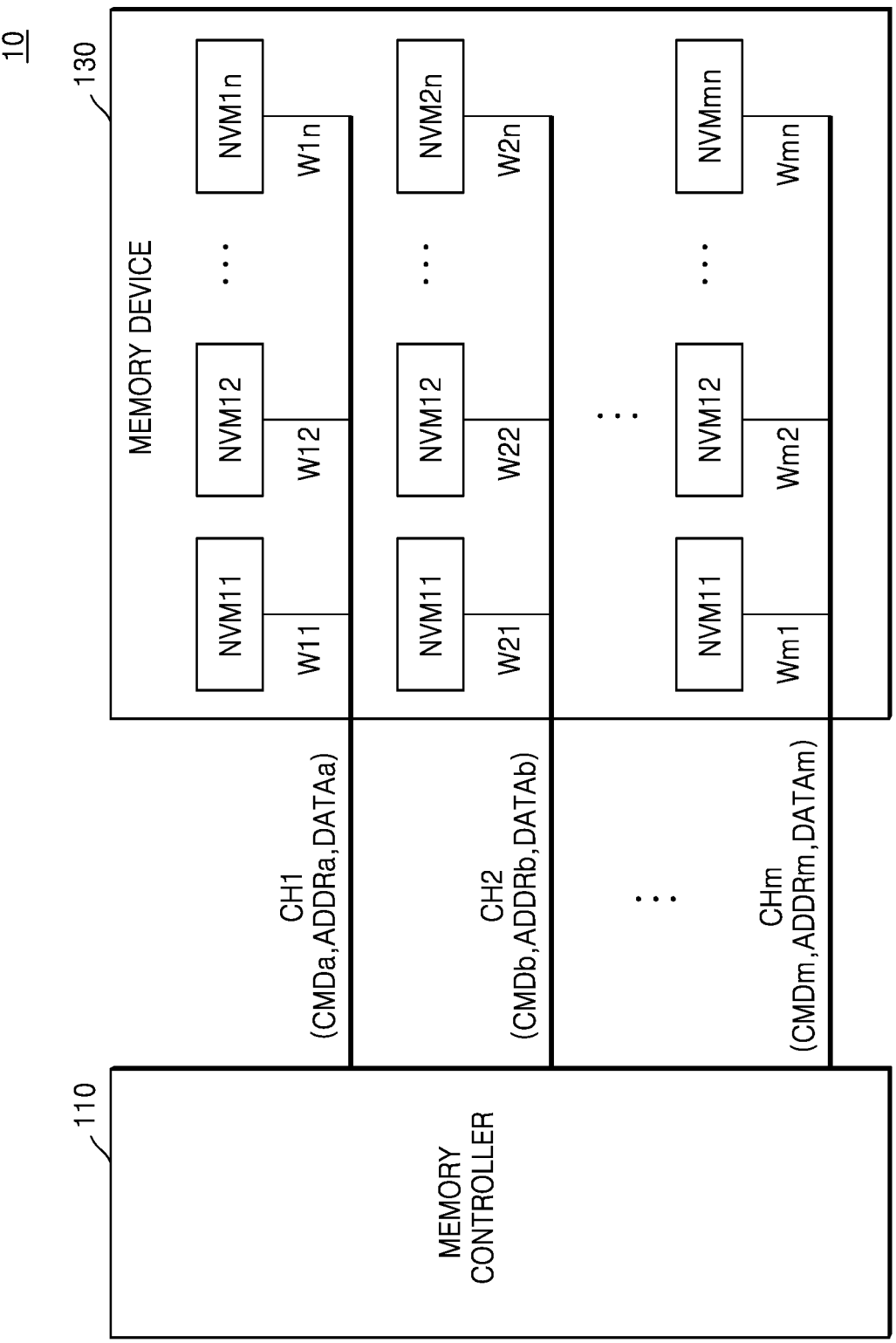
FIG. 18 is a block diagram illustrating a memory system according to an embodiment.

FIG. 18 is a block diagram illustrating a memory system 10 according to an embodiment. The above description of the memory system 10 of FIG. 1 may be applied within a range which differs from the following description of FIG. 18. Referring to FIG. 18, the memory system 10 may include a memory device 130 and a memory controller 110. The memory system 10 may support a plurality of channels CH1 to CHm, and the memory device 130 may be connected to the memory controller 110 through the plurality of channels CH1 to CHm. For example, the memory system 10 may be implemented as a storage device, such as an SSD.

The memory device 130 may include a plurality of NVM devices NVM11 to NVMmn.

Each of the NVM devices NVM11 to NVMmn may be connected to one of the plurality of channels CH1 to CHm through a way (e.g., a wiring, connector, or line) corresponding thereto. For instance, the NVM devices NVM11 to NVM1n may be connected to a first channel CH1 through ways W11 to W1n, and the NVM devices NVM21 to NVM2n may be connected to a second channel CH2 through ways W21 to W2n. In an example embodiment, each of the NVM devices NVM11 to NVMmn may be implemented as an arbitrary memory unit that may operate according to an individual command from the memory controller 110. For example, each of the NVM devices NVM11 to NVMmn may be implemented as a chip or a die, but the inventive concept is not limited thereto.

The memory controller 110 may transmit and receive signals to and from the memory device 130 through the plurality of channels CH1 to CHm. For example, the memory controller 110 may transmit commands CMDa to CMDm, addresses ADDRa to ADDRm, and data DATAa to DATAm to the memory device 130 through the channels CH1 to CHm or receive the data DATAa to DATAm from the memory device 130.

The memory controller 110 may select one of the NVM devices NVM11 to NVMmn, which is connected to each of the channels CH1 to CHm, by using a corresponding one of the channels CH1 to CHm, and transmit and receive signals to and from the selected NVM device. For example, the memory controller 110 may select the NVM device NVM11 from the NVM devices NVM11 to NVM1n connected to the first channel CH1. The memory controller 110 may transmit the command CMDa, the address ADDRa, and the data DATAa to the selected NVM device NVM11 through the first channel CH1 or receive the data DATAa from the selected NVM device NVM11.

The memory controller 110 may transmit and receive signals to and from the memory device 130 in parallel through different channels. For example, the memory controller 110 may transmit a command CMDb to the memory device 130 through the second channel CH2 while transmitting a command CMDa to the memory device 130 through the first channel CH1. For example, the memory controller 110 may receive data DATAb from the memory device 130 through the second channel CH2 while receiving data DATAa from the memory device 130 through the first channel CH1.

The memory controller 110 may control all operations of the memory device 130. The memory controller 110 may transmit a signal to the channels CH1 to CHm and control each of the NVM devices NVM11 to NVMmn connected to the channels CH1 to CHm. For instance, the memory controller 110 may transmit the command CMDa and the address ADDRa to the first channel CH1 and control one selected from the NVM devices NVM11 to NVM1n.

Each of the NVM devices NVM11 to NVMmn may operate via the control of the memory controller 110. For example, the NVM device NVM11 may program the data DATAa based on the command CMDa, the address ADDRa, and the data DATAa provided to the first channel CH1. For example, the NVM device NVM21 may read the data DATAb based on the command CMDb and the address ADDb provided to the second channel CH2 and transmit the read data DATAb to the memory controller 110.

Although FIG. 18 illustrates an example in which the memory device 130 communicates with the memory controller 110 through m channels and includes n NVM devices corresponding to each of the channels, the number of channels and the number of NVM devices connected to one channel may be variously changed.

Figure 19:
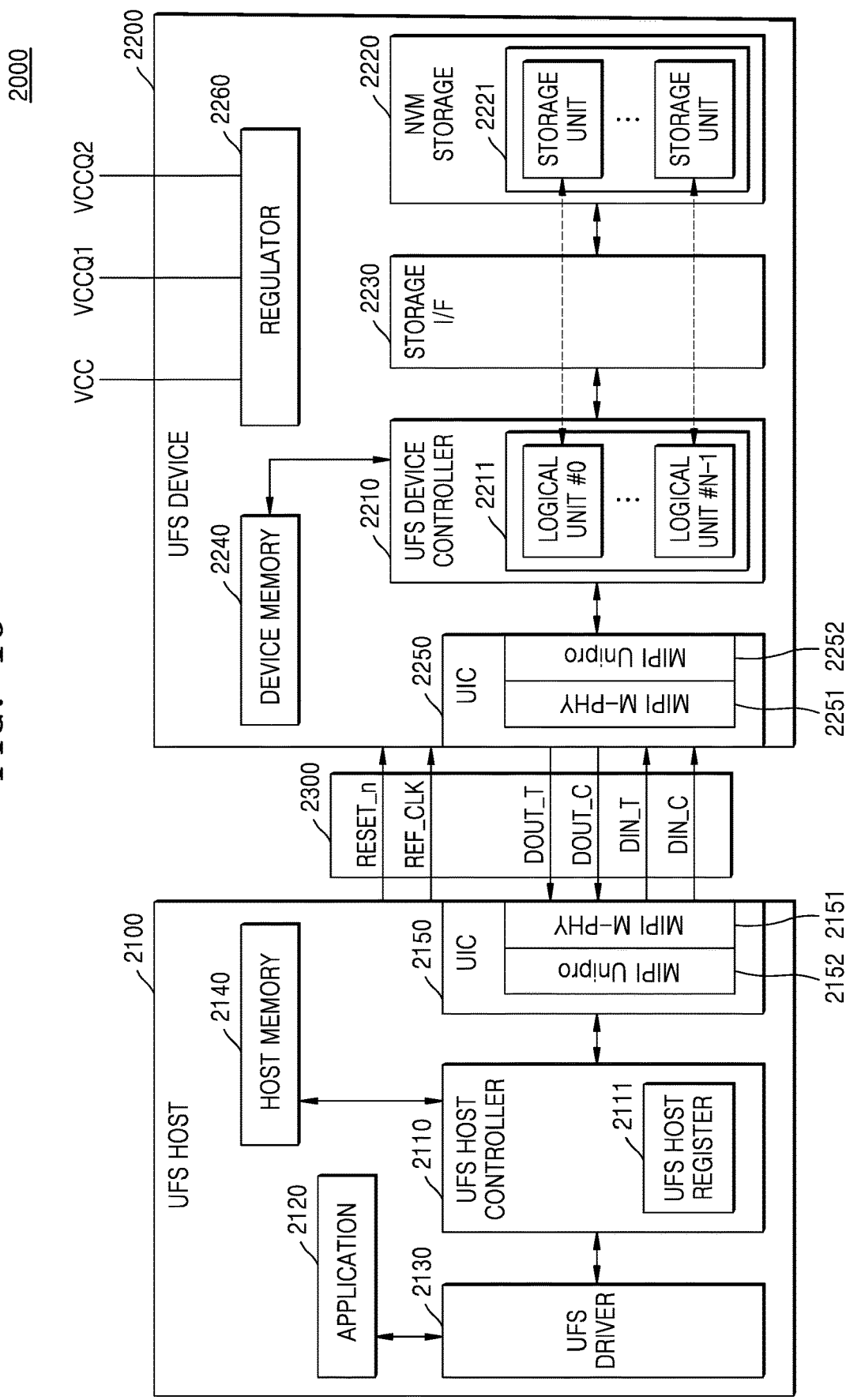
FIG. 19 is a block diagram describing a universal flash storage (UFS) system according to an embodiment.

FIG. 19 is a block diagram describing a UFS system 2000 according to an embodiment. According to an embodiment, each of the storage device 100 and the host device 200 each configuring the memory system 10 of FIG. 1 may use USF standard. The UFS system 2000 may be a system conforming to a UFS standard announced by Joint Electron Device Engineering Council (JEDEC) and include a UFS host 2100, a UFS device 2200, and a UFS interface 2300. The above description of the system 1000 of FIG. 1 may also be applied to the UFS system 2000 of FIG. 19 within a range that does not conflict with the following description of FIG. 19.

Referring to FIG. 19, the UFS host 2100 may be connected to the UFS device 2200 through the UFS interface 2300. When the main processor 1100 of FIG. 1 is an AP, the UFS host 2100 may be implemented as a portion of the AP. The UFS host controller 2110 and the host memory 2140 may respectively correspond to the controller 1120 of the main processor 1100 and the memories 1200a and 1200b of FIG. 1. The UFS device 2200 may correspond to the storage device 1300a and 1300b of FIG. 1, and a UFS device controller 2210 and an NVM 2220 may respectively correspond to the storage controllers 1310a and 1310b and the NVMs 1320a and 1320b of FIG. 1.

The UFS host 2100 may include a UFS host controller 2110, an application 2120, a UFS driver 2130, a host memory 2140, and a UFS interconnect (UIC) layer 2150. The UFS device 2200 may include the UFS device controller 2210, the NVM 2220, a storage interface 2230, a device memory 2240, a UIC layer 2250, and a regulator 2260. The NVM 2220 may include a plurality of memory units 2221. Although each of the memory units 2221 may include a V-NAND flash memory having a 2D structure or a 3D structure, each of the memory units 2221 may include another kind of NVM, such as PRAM and/or RRAM. The UFS device controller 2210 may be connected to the NVM 2220 through the storage interface 2230. The storage interface 2230 may be configured to comply with a standard protocol, such as Toggle or ONFI.

The application 2120 may refer to a program that wants to communicate with the UFS device 2200 to use functions of the UFS device 2200. The application 2120 may transmit input-output requests (IORs) to the UFS driver 2130 for input/output (I/O) operations on the UFS device 2200. The IORs may refer to a data read request, a data storage (or write) request, and/or a data erase (or discard) request, without being limited thereto.

The UFS driver 2130 may manage the UFS host controller 2110 through a UFS-host controller interface (UFS-HCI). The UFS driver 2130 may convert the IOR generated by the application 2120 into a UFS command defined by the UFS standard and transmit the UFS command to the UFS host controller 2110. One IOR may be converted into a plurality of UFS commands. Although the UFS command may basically be defined by an SCSI standard, the UFS command may be a command dedicated to the UFS standard.

The UFS host controller 2110 may transmit the UFS command converted by the UFS driver 2130 to the UIC layer 2250 of the UFS device 2200 through the UIC layer 2150 and the UFS interface 2300. During the transmission of the UFS command, a UFS host register 2111 of the UFS host controller 2110 may serve as a command queue (CQ).

The UIC layer 2150 on the side of the UFS host 2100 may include a mobile industry processor interface (MIPI) M-PHY 2151 and an MIPI UniPro 2152, and the UIC layer 2250 on the side of the UFS device 2200 may also include an MIPI M-PHY 2251 and an MIPI UniPro 2252.

The UFS interface 2300 may include a line configured to transmit a reference clock signal REF_CLK, a line configured to transmit a hardware reset signal RESET_n for the UFS device 2200, a pair of lines configured to transmit a pair of differential input signals DIN_t and DIN_c, and a pair of lines configured to transmit a pair of differential output signals DOUT_t and DOUT_c.

A frequency of a reference clock signal REF_CLK provided from the UFS host 2100 to the UFS device 2200 may be one of 19.2 MHz, 26 MHz, 38.4 MHz, and 52 MHz, without being limited thereto. The UFS host 2100 may change the frequency of the reference clock signal REF_CLK during an operation, for example, during data transmission/receiving operations between the UFS host 2100 and the UFS device 2200. The UFS device 2200 may generate clock signals having various frequencies from the reference clock signal REF_CLK provided from the UFS host 2100, by using a phase-locked loop (PLL). Also, the UFS host 2100 may set a data rate between the UFS host 2100 and the UFS device 2200 by using the frequency of the reference clock signal REF_CLK. For example, the data rate may be determined depending on the frequency of the reference clock signal REF_CLK.

The UFS interface 2300 may support a plurality of lanes, each of which may be implemented as a pair of differential lines. For example, the UFS interface 2300 may include at least one receiving lane and at least one transmission lane. In FIG. 19, a pair of lines configured to transmit a pair of differential input signals DIN_T and DIN_C may constitute a receiving lane, and a pair of lines configured to transmit a pair of differential output signals DOUT_T and DOUT_C may constitute a transmission lane. Although one transmission lane and one receiving lane are illustrated in FIG. 19, the number of transmission lanes and the number of receiving lanes may be changed.

The receiving lane and the transmission lane may transmit data based on a serial communication scheme. Full-duplex communications between the UFS host 2100 and the UFS device 2200 may be enabled due to a structure in which the receiving lane is separated from the transmission lane. For example, while receiving data from the UFS host 2100 through the receiving lane, the UFS device 2200 may transmit data to the UFS host 2100 through the transmission lane. In addition, control data (e.g., a command) from the UFS host 2100 to the UFS device 2200 and user data to be stored in or read from the NVM 2220 of the UFS device 2200 by the UFS host 2100 may be transmitted through the same lane. Accordingly, between the UFS host 2100 and the UFS device 2200, there may be no need to further provide a separate lane for data transmission in addition to a pair of receiving lanes and a pair of transmission lanes.

The UFS device controller 2210 of the UFS device 2200 may control all operations of the UFS device 2200. The UFS device controller 2210 may manage the NVM 2220 by using a logical unit (LU) 2211, which is a logical data storage unit. The number of LUs 2211 may be 8, without being limited thereto. The UFS device controller 2210 may include an FTL and convert a logical data address (e.g., a logical block address (LBA)) received from the UFS host 2100 into a physical data address (e.g., a physical block address (PBA)) by using address mapping information of the FTL. A logical block configured to store user data in the UFS system 2000 may have a size in a predetermined range. For example, a minimum size of the logical block may be set to 4 Kbyte.

When a command from the UFS host 2100 is applied through the UIC layer 2250 to the UFS device 2200, the UFS device controller 2210 may perform an operation in response to the command and transmit a completion response to the UFS host 2100 when the operation is completed.

As an example, when the UFS host 2100 intends to store user data in the UFS device 2200, the UFS host 2100 may transmit a data storage command to the UFS device 2200. When a response (a 'ready-to-transfer' response) indicating that the UFS host 2100 is ready to receive user data (ready-to-transfer) is received from the UFS device 2200, the UFS host 2100 may transmit user data to the UFS device 2200. The UFS device controller 2210 may temporarily store the received user data in the device memory 2240 and store the user data, which is temporarily stored in the device memory 2240, at a selected position of the NVM 2220 based on the address mapping information of the FTL.

As another example, when the UFS host 2100 intends to read the user data stored in the UFS device 2200, the UFS host 2100 may transmit a data read command to the UFS device 2200. The UFS device controller 2210, which has received the command, may read the user data from the NVM 2220 based on the data read command and temporarily store the read user data in the device memory 2240. During the read operation, the UFS device controller 2210 may detect and correct an error in the read user data by using an ECC engine (not shown) embedded therein. More specifically, the ECC engine may generate parity bits for write data to be written to the NVM 2220, and the generated parity bits may be stored in the NVM 2220 along with the write data. During the reading of data from the NVM 2220, the ECC engine may correct an error in read data by using the parity bits read from the NVM 2220 along with the read data, and output error-corrected read data.

In addition, the UFS device controller 2210 may transmit user data, which is temporarily stored in the device memory 2240, to the UFS host 2100. In addition, the UFS device controller 2210 may further include an AES engine (not shown). The AES engine may perform at least of an encryption operation and a decryption operation on data transmitted to the UFS device controller 2210 by using a symmetric-key algorithm.

The UFS host 2100 may sequentially store commands, which are to be transmitted to the UFS device 2200, in the UFS host register 2111, which may serve as a common queue, and sequentially transmit the commands to the UFS device 2200. In this case, even while a previously transmitted command is still being processed by the UFS device 2200, that is, even before receiving a notification that the previously transmitted command has been processed by the UFS device 2200, the UFS host 2100 may transmit a next command, which is on standby in the CQ, to the UFS device 2200. Thus, the UFS device 2200 may also receive a next command from the UFS host 2100 during the processing of the previously transmitted command. A maximum number (or queue depth) of commands that may be stored in the CQ may be, for example, 32. Also, the CQ may be implemented as a circular queue in which a start and an end of a command line stored in a queue are indicated by a head pointer and a tail pointer.

Each of the plurality of memory units 2221 may include a memory cell array (not shown) and a control circuit (not shown) configured to control an operation of the memory cell array. The memory cell array may include a 2D memory cell array or a 3D memory cell array. The memory cell array may include a plurality of memory cells. Although each of the memory cells is a single-level cell (SLC) configured to store 1-bit information, each of the memory cells may be a cell configured to store information of 2 bits or more, such as a multi-level cell (MLC), a triple-level cell (TLC), and a quadruple-level cell (QLC). The 3D memory cell array may include a vertical NAND string in which at least one memory cell is vertically oriented and located on another memory cell.

Voltages VCC, VCCQ, and VCCQ2 may be applied as power supply voltages to the UFS device 2200. The voltage VCC may be a main power supply voltage for the UFS device 2200 and be in a range of 2.4 V to 3.6 V. The voltage VCCQ may be a power supply voltage for supplying a low voltage mainly to the UFS device controller 2210 and be in a range of 1.14 V to 1.26 V. The voltage VCCQ2 may be a power supply voltage for supplying a voltage, which is lower than the voltage VCC and higher than the voltage VCCQ, mainly to an I/O interface, such as the MIPI M-PHY 2251, and be in a range of 1.7 V to 1.95 V. The power supply voltages may be supplied through the regulator 2260 to respective components of the UFS device 2200. The regulator 2260 may be implemented as a set of unit regulators respectively connected to different ones of the power supply voltages described above.

Figure 20:
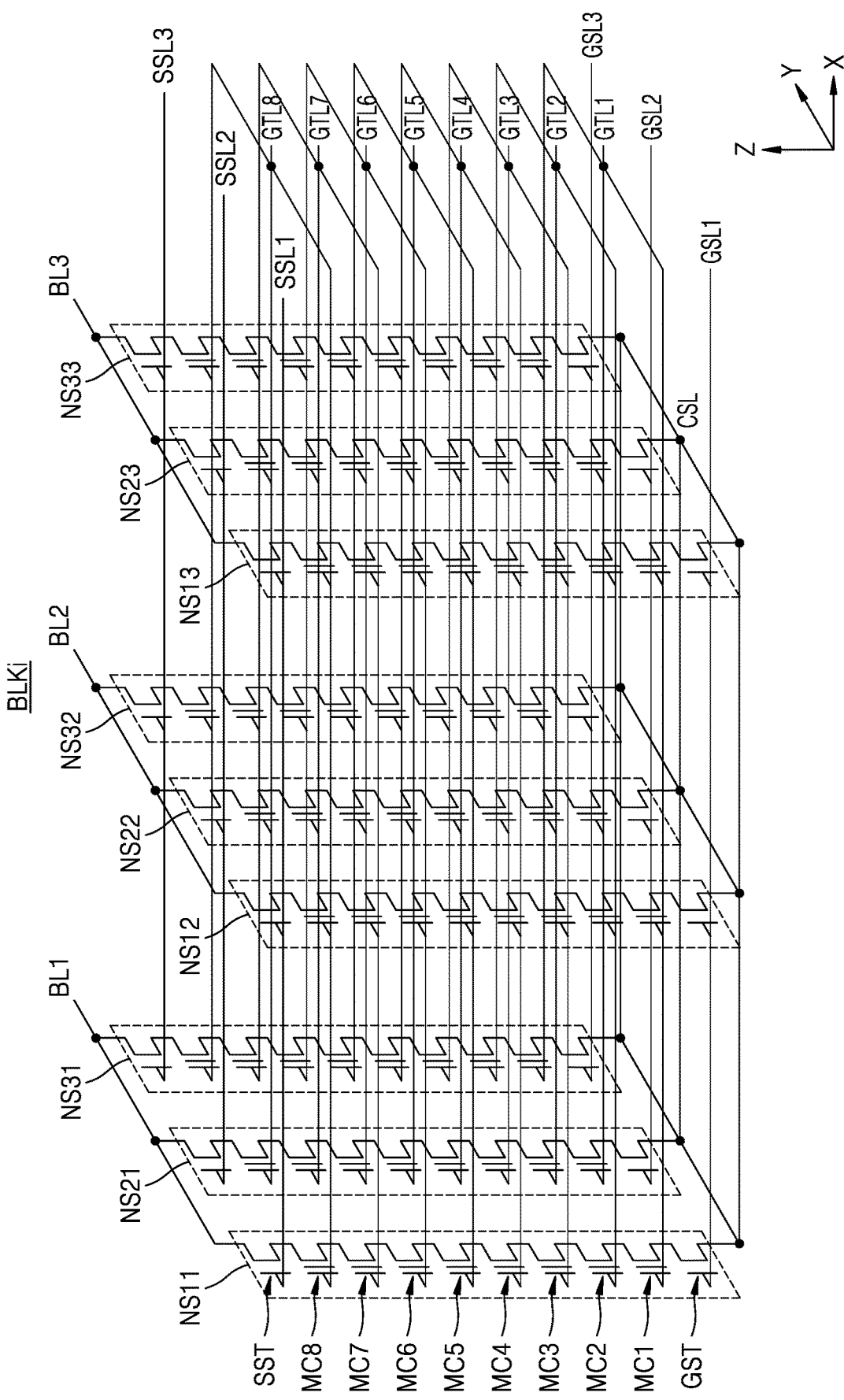
FIG. 20 is a diagram describing a three-dimensional (3D) vertical-NAND (3D V-NAND) structure applicable to a storage device, according to an embodiment.

FIG. 20 is a diagram describing a three-dimensional (3D) vertical-NAND (3D V-NAND) structure applicable to a storage device, according to an embodiment.

FIG. 20 is a diagram of a 3D V-NAND structure applicable to a UFS device according to an embodiment. When a storage module of the UFS device is implemented as a 3D V-NAND flash memory, each of a plurality of memory blocks included in the storage module may be represented by an equivalent circuit shown in FIG. 20.

A memory block BLKi shown in FIG. 20 may refer to a 3D memory block having a 3D structure formed on a substrate. For example, a plurality of memory NAND strings included in the memory block BLKi may be formed in a vertical direction to the substrate.

Referring to FIG. 20, the memory block BLKi may include a plurality of memory NAND strings (e.g., NS11 to NS33), which are connected between bit lines BL1, BL2, and BL3 and a common source line CSL. Each of the memory NAND strings NS11 to NS33 may include a string selection transistor SST, a plurality of memory cells (e.g., MC1, MC2, . . . , and MC8), and a ground selection transistor GST. Each of the memory NAND strings NS11 to NS33 is illustrated as including eight memory cells MC1, MC2, . . . , and MC8 in FIG. 20, without being limited thereto.

The string selection transistor SST may be connected to string selection lines SSL1, SSL2, and SSL3 corresponding thereto. Each of the memory cells MC1, MC2, . . . , and MC8 may be connected to a corresponding one of gate lines GTL1, GTL2, . . . , and GTL8. The gate lines GTL1, GTL2, . . . , and GTL8 may respectively correspond to word lines, and some of the gate lines GTL1, GTL2, . . . , and GTL8 may correspond to dummy word lines. The ground selection transistor GST may be connected to ground selection lines GSL1, GSL2, and GSL3 corresponding thereto. The string selection transistor SST may be connected to the bit lines BL1, BL2, and BL3 corresponding thereto, and the ground selection transistor GST may be connected to the common source line CSL.

Word lines (e.g., WL1) at the same level may be connected in common, and the ground selection lines GSL1, GSL2, and GSL3 and the string selection lines SSL1, SSL2, and SSL3 may be separated from each other. FIG. 20 illustrates a case in which a memory block BLK is connected to eight gate lines GTL1, GTL2, . . . , and GTL8 and three bit lines BL1, BL2, and BL3, without being limited thereto.

Figure 21:
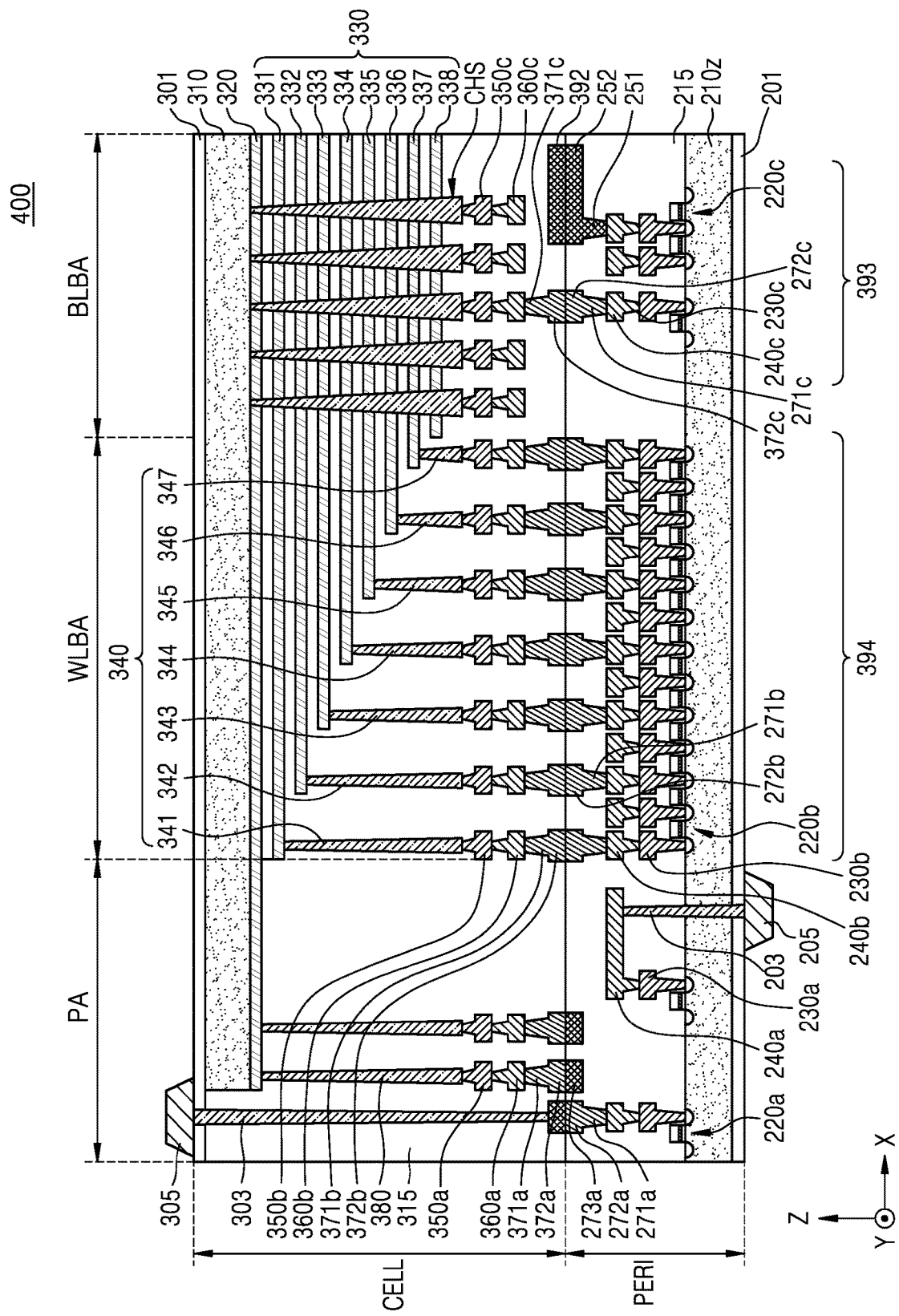
FIG. 21 is a diagram describing a 3D V-NAND structure capable of being applied to a storage device, according to an embodiment.

FIG. 21 is a diagram describing a memory device 400 having a 3D V-NAND structure capable of being applied to a storage device 100, according to an embodiment.

Referring to FIG. 21, a memory device 400 may have a chip-to-chip (C2C) structure. The C2C structure may refer to a structure formed by manufacturing an upper chip including a cell region CELL on a first wafer, manufacturing a lower chip including a peripheral circuit region PERI on a second wafer, separate from the first wafer, and then bonding the upper chip and the lower chip to each other. Here, the bonding process may include a method of electrically connecting a bonding metal formed on an uppermost metal layer of the upper chip and a bonding metal formed on an uppermost metal layer of the lower chip. For example, when the bonding metals may include copper (Cu) using a Cu-to-Cu bonding. The example embodiment, however, is not limited thereto. For example, the bonding metals may also be formed of aluminum (Al) or tungsten (W).

Each of the peripheral circuit region PERI and the cell region CELL of the memory device 400 may include an external pad bonding area PA, a word line bonding area WLBA, and a bit line bonding area BLBA.

The peripheral circuit region PERI may include a first substrate 210z, an interlayer insulating layer 215, a plurality of circuit elements 220a, 220b, and 220c formed on the first substrate 210z, first metal layers 230a, 230b, and 230c respectively connected to the plurality of circuit elements 220a, 220b, and 220c, and second metal layers 240a, 240b, and 240c formed on the first metal layers 230a, 230b, and 230c. In an example embodiment, the first metal layers 230a, 230b, and 230c may be formed of tungsten having relatively high electrical resistivity, and the second metal layers 240a, 240b, and 240c may be formed of copper having relatively low electrical resistivity.

In an example embodiment illustrate in FIG. 21, although only the first metal layers 230a, 230b, and 230c and the second metal layers 240a, 240b, and 240c are shown and described, the example embodiment is not limited thereto, and one or more additional metal layers may be further formed on the second metal layers 240a, 240b, and 240c. At least a portion of the one or more additional metal layers formed on the second metal layers 240a, 240b, and 240c may be formed of aluminum or the like having a lower electrical resistivity than those of copper forming the second metal layers 240a, 240b, and 240c.

The interlayer insulating layer 215 may be disposed on the first substrate 210z and cover the plurality of circuit elements 220a, 220b, and 220c, the first metal layers 230a, 230b, and 230c, and the second metal layers 240a, 240b, and 240c. The interlayer insulating layer 215 may include an insulating material such as silicon oxide, silicon nitride, or the like.

Lower bonding metals 271b and 272b may be formed on the second metal layer 240b in the word line bonding area WLBA. In the word line bonding area WLBA, the lower bonding metals 271b and 272b in the peripheral circuit region PERI may be electrically bonded to upper bonding metals 371b and 372b of the cell region CELL. The lower bonding metals 271b and 272b and the upper bonding metals 371b and 372b may be formed of aluminum, copper, tungsten, or the like. Further, the upper bonding metals 371b and 372b in the cell region CELL may be referred as first metal pads and the lower bonding metals 5271b and 5272b in the peripheral circuit region PERI may be referred as second metal pads.

The cell region CELL may include at least one memory block. The cell region CELL may include a second substrate 310 and a common source line 320. On the second substrate 310, a plurality of word lines 331 to 338 (i.e., 330) may be stacked in a direction (a Z-axis direction), perpendicular to an upper surface of the second substrate 310. At least one string select line and at least one ground select line may be arranged on and below the plurality of word lines 330, respectively, and the plurality of word lines 330 may be disposed between the at least one string select line and the at least one ground select line.

In the bit line bonding area BLBA, a channel structure CH may extend in a direction (a Z-axis direction), perpendicular to the upper surface of the second substrate 310, and pass through the plurality of word lines 330, the at least one string select line, and the at least one ground select line. The channel structure CH may include a data storage layer, a channel layer, a buried insulating layer, and the like, and the channel layer may be electrically connected to a first metal layer 350c and a second metal layer 360c. For example, the first metal layer 350c may be a bit line contact, and the second metal layer 360c may be a bit line. In an example embodiment, the bit line 360c may extend in a first direction (a Y-axis direction), parallel to the upper surface of the second substrate 310.

In an example embodiment illustrated in FIG. 21, an area in which the channel structure CH, the bit line 360c, and the like are disposed may be defined as the bit line bonding area BLBA. In the bit line bonding area BLBA, the bit line 360c may be electrically connected to the circuit elements 220c providing a page buffer 393 in the peripheral circuit region PERI. The bit line 360c may be connected to upper bonding metals 371c and 372c in the cell region CELL, and the upper bonding metals 371c and 372c may be connected to lower bonding metals 271c and 272c connected to the circuit elements 220c of the page buffer 393.

In the word line bonding area WLBA, the plurality of word lines 330 may extend in a second direction (an X-axis direction), parallel to the upper surface of the second substrate 310 and perpendicular to the first direction, and may be connected to a plurality of cell contact plugs 341 to 347 (i.e., 340). The plurality of word lines 330 and the plurality of cell contact plugs 340 may be connected to each other in pads provided by at least a portion of the plurality of word lines 330 extending in different lengths in the second direction. A first metal layer 350b and a second metal layer 360b may be connected to an upper portion of the plurality of cell contact plugs 340 connected to the plurality of word lines 330, sequentially. The plurality of cell contact plugs 340 may be connected to the peripheral circuit region PERI by the upper bonding metals 371b and 372b of the cell region CELL and the lower bonding metals 271b and 272b of the peripheral circuit region PERI in the word line bonding area WLBA.

The plurality of cell contact plugs 340 may be electrically connected to the circuit elements 220b forming a row decoder 394 in the peripheral circuit region PERI. In an example embodiment, operating voltages of the circuit elements 220b of the row decoder 394 may be different than operating voltages of the circuit elements 220c forming the page buffer 393. For example, operating voltages of the circuit elements 220c forming the page buffer 393 may be greater than operating voltages of the circuit elements 220b forming the row decoder 394.

A common source line contact plug 380 may be disposed in the external pad bonding area PA. The common source line contact plug 380 may be formed of a conductive material such as a metal, a metal compound, polysilicon, or the like, and may be electrically connected to the common source line 320. A first metal layer 350a and a second metal layer 360a may be stacked on an upper portion of the common source line contact plug 380, sequentially. For example, an area in which the common source line contact plug 380, the first metal layer 350a, and the second metal layer 360a are disposed may be defined as the external pad bonding area PA.

Input-output pads 205 and 305 may be disposed in the external pad bonding area PA. Referring to FIG. 21, a lower insulating film 201 covering a lower surface of the first substrate 210z may be formed below the first substrate 210z, and a first input-output pad 205 may be formed on the lower insulating film 201. The first input-output pad 205 may be connected to at least one of the plurality of circuit elements 220a, 220b, and 220c disposed in the peripheral circuit region PERI through a first input-output contact plug 203, and may be separated from the first substrate 210z by the lower insulating film 201. In addition, a side insulating film may be disposed between the first input-output contact plug 203 and the first substrate 210z to electrically separate the first input-output contact plug 203 and the first substrate 210z.

Referring to FIG. 21, an upper insulating film 301 covering the upper surface of the second substrate 310 may be formed on the second substrate 310, and a second input-output pad 305 may be disposed on the upper insulating layer 301. The second input-output pad 305 may be connected to at least one of the plurality of circuit elements 220a, 220b, and 220c disposed in the peripheral circuit region PERI through a second input-output contact plug 303. In the example embodiment, the second input-output pad 305 is electrically connected to a circuit element 220a.

According to embodiments, the second substrate 310 and the common source line 320 may not be disposed in an area in which the second input-output contact plug 303 is disposed. Also, the second input-output pad 305 may not overlap the word lines 330 in the third direction (the Z-axis direction). Referring to FIG. 21, the second input-output contact plug 303 may be separated from the second substrate 310 in a direction, parallel to the upper surface of the second substrate 310, and may pass through the interlayer insulating layer 315 of the cell region CELL to be connected to the second input-output pad 305.

According to embodiments, the first input-output pad 205 and the second input-output pad 305 may be selectively formed. For example, the memory device 400 may include only the first input-output pad 205 disposed on the first substrate 210z or the second input-output pad 305 disposed on the second substrate 310. Alternatively, the memory device 400 may include both the first input-output pad 205 and the second input-output pad 305.

A metal pattern provided on an uppermost metal layer may be provided as a dummy pattern or the uppermost metal layer may be absent, in each of the external pad bonding area PA and the bit line bonding area BLBA, respectively included in the cell region CELL and the peripheral circuit region PERI.

In the external pad bonding area PA, the memory device 400 may include a lower metal pattern 273a, corresponding to an upper metal pattern 372a formed in an uppermost metal layer of the cell region CELL, and having the same cross-sectional shape as the upper metal pattern 372a of the cell region CELL so as to be connected to each other, in an uppermost metal layer of the peripheral circuit region PERI. In the peripheral circuit region PERI, the lower metal pattern 273a formed in the uppermost metal layer of the peripheral circuit region PERI may not be connected to a contact. Similarly, in the external pad bonding area PA, an upper metal pattern 372a, corresponding to the lower metal pattern 273a formed in an uppermost metal layer of the peripheral circuit region PERI, and having the same shape as a lower metal pattern 273a of the peripheral circuit region PERI, may be formed in an uppermost metal layer of the cell region CELL.

The lower bonding metals 271b and 272b may be formed on the second metal layer 240b in the word line bonding area WLBA. In the word line bonding area WLBA, the lower bonding metals 271b and 272b of the peripheral circuit region PERI may be electrically connected to the upper bonding metals 371b and 372b of the cell region CELL by a Cu-to-Cu bonding.

Further, in the bit line bonding area BLBA, an upper metal pattern 392, corresponding to a lower metal pattern 252 formed in the uppermost metal layer of the peripheral circuit region PERI, and having the same cross-sectional shape as the lower metal pattern 252 of the peripheral circuit region PERI, may be formed in an uppermost metal layer of the cell region CELL. A contact may not be formed on the upper metal pattern 392 formed in the uppermost metal layer of the cell region CELL.

In an example embodiment, corresponding to a metal pattern formed in an uppermost metal layer in one of the cell region CELL and the peripheral circuit region PERI, a reinforcement metal pattern having the same cross-sectional shape as the metal pattern may be formed in an uppermost metal layer in the other one of the cell region CELL and the peripheral circuit region PERI. A contact may not be formed on the reinforcement metal pattern.

Figure 22:
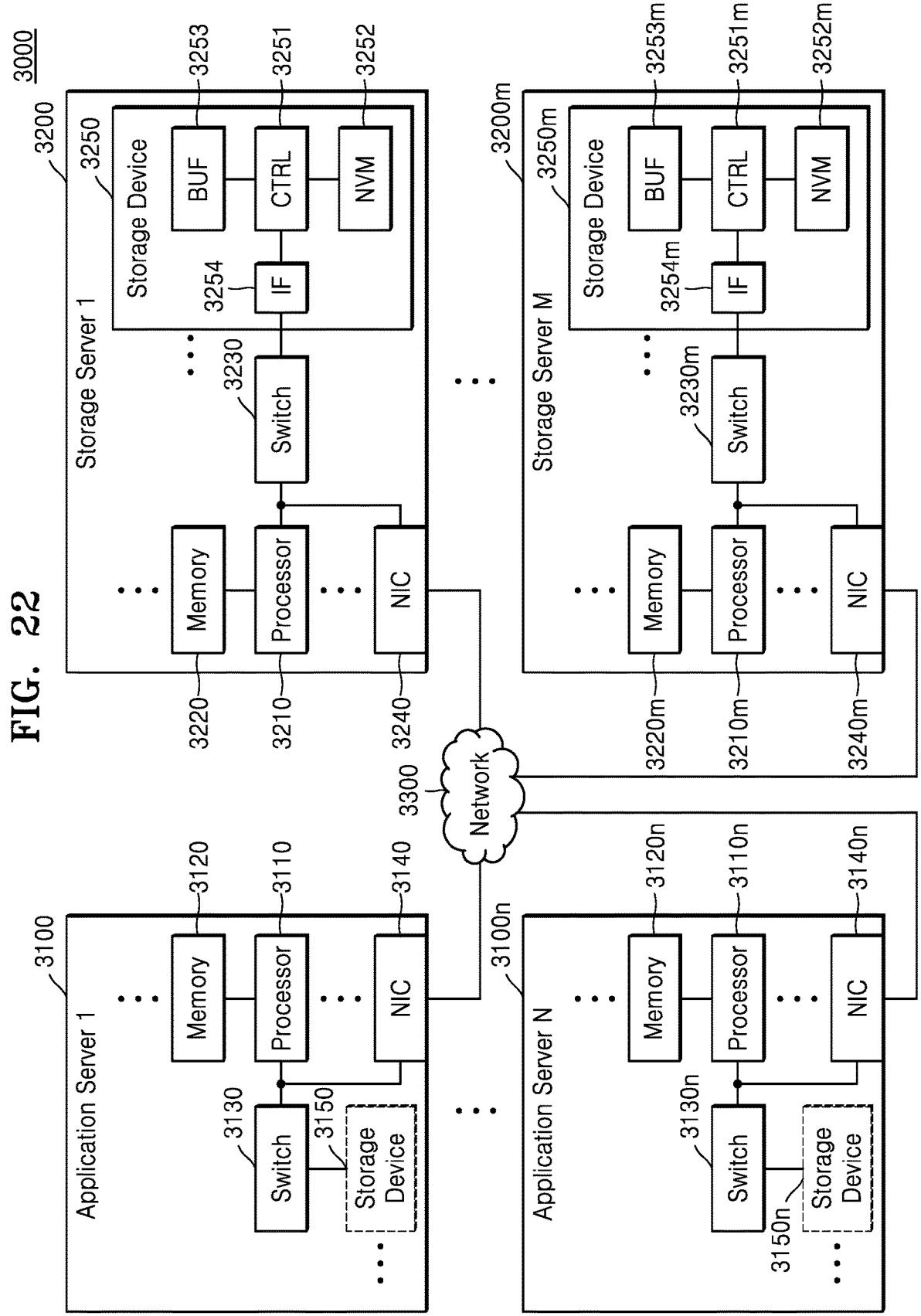
FIG. 22 is a block diagram illustrating a data center to which a memory system according to an embodiment is applied.

FIG. 22 is a block diagram illustrating a data center 3000 to which a memory system according to an embodiment is applied. In an embodiment, the memory system 10 of FIG. 1 may be applied to the data center 3000.

Referring to FIG. 22, the data center 3000 may be a facility that collects various types of pieces of data and provides services and be referred to as a data storage center. The data center 3000 may be a system for operating a search engine and a database, and may be a computing system used by companies, such as banks, or government agencies. The data center 3000 may include application servers 3100 to 3100n and storage servers 3200 to 3200m. The number of application servers 3100 to 3100n and the number of storage servers 3200 to 3200m may be variously selected according to embodiments. The number of application servers 3100 to 3100n may be different from the number of storage servers 3200 to 3200m.

The application server 3100 or the storage server 3200 may include at least one of processors 3110 and 3210 and memories 3120 and 3220. The storage server 3200 will now be described as an example. The processor 3210 may control all operations of the storage server 3200, access the memory 3220, and execute instructions and/or data loaded in the memory 3220. The memory 3220 may be a double-data-rate synchronous DRAM (DDR SDRAM), a high-bandwidth memory (HBM), a hybrid memory cube (HMC), a dual in-line memory module (DIMM), Optane DIMM, or a non-volatile DIMM (NVMDIMM). In some embodiments, the numbers of processors 3210 and memories 3220 included in the storage server 3200 may be variously selected. In an embodiment, the processor 3210 and the memory 3220 may provide a processor-memory pair. In an embodiment, the number of processors 3210 may be different from the number of memories 3220. The processor 3210 may include a single-core processor or a multi-core processor. The above description of the storage server 3200 may be similarly applied to the application server 3100. In some embodiments, the application server 3100 may not include a storage device 3150. The storage server 3200 may include at least one storage device 3250. The number of storage devices 3250 included in the storage server 3200 may be variously selected according to embodiments.

The application servers 3100 to 3100n may communicate with the storage servers 3200 to 3200m through a network 3300. The network 3300 may be implemented by using a fiber channel (FC) or Ethernet. In this case, the FC may be a medium used for relatively high-speed data transmission and use an optical switch with high performance and high availability. The storage servers 3200 to 3200m may be provided as file storages, block storages, or object storages according to an access method of the network 3300.

In an embodiment, the network 3300 may be a storage-dedicated network, such as a storage area network (SAN). For example, the SAN may be an FC-SAN, which uses an FC network and is implemented according to an FC protocol (FCP). As another example, the SAN may be an Internet protocol (IP)-SAN, which uses a transmission control protocol (TCP)/IP network and is implemented according to a SCSI over TCP/IP or Internet SCSI (iSCSI) protocol. In another embodiment, the network 3300 may be a general network, such as a TCP/IP network. For example, the network 3300 may be implemented according to a protocol, such as FC over Ethernet (FCoE), network attached storage (NAS), and NVMe over Fabrics (NVMe-oF).

Hereinafter, the application server 3100 and the storage server 3200 will mainly be described. A description of the application server 3100 may be applied to another application server 3100n, and a description of the storage server 3200 may be applied to another storage server 3200m.

The application server 3100 may store data, which is requested by a user or a client to be stored, in one of the storage servers 3200 to 3200m through the network 3300. Also, the application server 3100 may obtain data, which is requested by the user or the client to be read, from one of the storage servers 3200 to 3200m through the network 3300. For example, the application server 3100 may be implemented as a web server or a database management system (DBMS).

The application server 3100 may access a memory 3120n or a storage device 3150n, which is included in another application server 3100n, through the network 3300. Alternatively, the application server 3100 may access memories 3220 to 3220m or storage devices 3250 to 3250m, which are included in the storage servers 3200 to 3200m, through the network 3300. Thus, the application server 3100 may perform various operations on data stored in application servers 3100 to 3100n and/or the storage servers 3200 to 3200m. For example, the application server 3100 may execute an instruction for moving or copying data between the application servers 3100 to 3100n and/or the storage servers 3200 to 3200m. In this case, the data may be moved from the storage devices 3250 to 3250m of the storage servers 3200 to 3200m to the memories 3120 to 3120n of the application servers 3100 to 3100n directly or through the memories 3220 to 3220m of the storage servers 3200 to 3200m. The data moved through the network 3300 may be data encrypted for security or privacy.

The storage server 3200 will now be described as an example. An interface 3254 may provide physical connection between a processor 3210 and a controller 3251 and a physical connection between a network interface card (NIC) 3240 and the controller 3251. For example, the interface 3254 may be implemented using a direct attached storage (DAS) scheme in which the storage device 3250 is directly connected with a dedicated cable. For example, the interface 3254 may be implemented by using various interface schemes, such as ATA, SATA, e-SATA, an SCSI, SAS, PCI, PCIe, NVMe, IEEE 1394, a USB interface, an SD card interface, an MMC interface, an eMMC interface, a UFS interface, an eUFS interface, and a CF card interface.

The storage server 3200 may further include a switch 3230 and the NIC (Network InterConnect) 3240. The switch 3230 may selectively connect the processor 3210 to the storage device 3250 or selectively connect the NIC 3240 to the storage device 3250 via the control of the processor 3210.

In an embodiment, the NIC 3240 may include a network interface card and a network adaptor. The NIC 3240 may be connected to the network 3300 by a wired interface, a wireless interface, a Bluetooth interface, or an optical interface. The NIC 3240 may include an internal memory, a digital signal processor (DSP), and a host bus interface and be connected to the processor 3210 and/or the switch 3230 through the host bus interface. The host bus interface may be implemented as one of the above-described examples of the interface 3254. In an embodiment, the NIC 3240 may be integrated with at least one of the processor 3210, the switch 3230, and the storage device 3250.

In the storage servers 3200 to 3200m or the application servers 3100 to 3100n, a processor may transmit a command to storage devices 3150 to 3150n and 3250 to 3250m or the memories 3120 to 3120n and 3220 to 3220m and program or read data. In this case, the data may be data of which an error is corrected by an ECC engine. The data may be data on which a data bus inversion (DBI) operation or a data masking (DM) operation is performed, and may include cyclic redundancy code (CRC) information. The data may be data encrypted for security or privacy.

Storage devices 3150 to 3150n and 3250 to 3250m may transmit a control signal and a command/address signal to NAND flash memory devices 3252 to 3252m in response to a read command received from the processor. Thus, when data is read from the NAND flash memory devices 3252 to 3252m, a read enable (RE) signal may be input as a data output control signal, and thus, the data may be output to a DQ bus. A data strobe signal DQS may be generated using the RE signal. The command and the address signal may be latched in a page buffer depending on a rising edge or falling edge of a write enable (WE) signal.

The controller 3251 may control all operations of the storage device 3250. In an embodiment, the controller 3251 may include SRAM. The controller 3251 may write data to the NAND flash memory device 3252 in response to a write command or read data from the NAND flash memory device 3252 in response to a read command. For example, the write command and/or the read command may be provided from the processor 3210 of the storage server 3200, the processor 3210m of another storage server 3200m, or the processors 3110 and 3110n of the application servers 3100 and 3100n. DRAM 3253 may temporarily store (or buffer) data to be written to the NAND flash memory device 3252 or data read from the NAND flash memory device 3252. Also, the DRAM 3253 may store metadata. Here, the metadata may be user data or data generated by the controller 3251 to manage the NAND flash memory device 3252. The storage device 3250 may include a secure element (SE) for security or privacy.

While the inventive concept has been particularly shown and described with reference to embodiments thereof, it will be understood that various changes in form and details may be made therein without departing from the spirit and scope of the following claims.

What is claimed is:

1. An operating method of a storage device including a core and a memory that is a non-volatile memory, the operating method comprising:
   receiving a first processing code configured to enable execution of a first task and storing the first processing code in a first logical unit separately allocated in the memory for near-data processing (NDP), in response to a write command received from a host device;
   activating the core for executing the first processing code, in response to an activation command received from the host device; and
   executing the first task by using the core, in response to an execution command received from the host device,
   wherein the activating of the core is performed when the core is in an idle status,
   wherein the storage device comprises a memory controller including the core, and
   wherein the storing of the first processing code comprises:
   checking, by using the memory controller, a size of the first processing code based on the write command; and
   segmenting and receiving, by using the memory controller, the first processing code by a number of times corresponding to a size of the first processing code.

2. The operating method of claim 1, wherein the storage device further comprises a sub-memory tightly coupled to the core, and
   the checking of the size of the first processing code comprises:
   comparing, by using the memory controller, a unit storage size of the sub-memory with the size of the first processing code; and
   transferring, by using the memory controller, a ready-to-transfer response equal to the number of times, corresponding to the size of the first processing code, to the host device.

3. The operating method of claim 1, further comprising:
   receiving a second processing code configured to enable execution of a second task from the host device; and
   storing the second processing code in a second logical unit separately allocated in the memory for the NDP.

4. The operating method of claim 1, wherein:
   the storage device further comprises a sub-memory tightly coupled to the core,
   the activation command further comprises a fetch command, and further comprising:
   fetching the first processing code loaded to the sub-memory based on the fetch command.

5. The operating method of claim 4, wherein the fetching of the first processing code comprises:
   storing the fetch command in a queue; and
   performing, by using the core, fetch from the sub-memory on the basis of the fetch command in accordance with an order of the queue.

6. The operating method of claim 1, wherein the idle status is a status where the core does not perform a memory operation including a read operation, a write operation, or an erase operation.

7. The operating method of claim 1, wherein the executing of the first task comprises:
   storing a task result in a second logical unit allocated for user data; and
   transferring an address, at which the task result is stored, to the host device.

8. The operating method of claim 1, wherein the first logical unit is included in a standard function area.

9. The operating method of claim 1, wherein the first task comprises compression, encryption, quantization, a matrix operation, floating point conversion, tree search, swap, repetition removal, pruning, rendering, or data mining.

10. The operating method of claim 1, wherein the first task is reprogrammable.

11. An operating method of a storage device having a non-volatile memory and a core, the operating method comprising:
    receiving an encryption code, obtained by encrypting a processing code configured to execute a task, from a host device;
    verifying a hash value of the encryption code based on a private key, and obtaining the processing code by decrypting the encryption code based on verification success;
    storing the processing code in a first logical unit separately allocated in the memory for near-data processing (NDP);
    fetching the processing code from the first logical unit;
    when the core is in an idle status, activating the core; and
    performing the task by using the core.

12. The operating method of claim 11, wherein the receiving of the encryption code comprises:
determining an encryption method and providing a public key to the host device, on the basis of a public key request of the host device; and
receiving the encryption code, obtained through encryption based on the public key, from the host device.

13. The operating method of claim 11, wherein a method of encrypting the encryption code comprises at least one of a Rivest-Shamir-Adleman (RSA) encryption method, a secure hash algorithm (SHA) encryption method, an error correction code (ECC) encryption method, and a digital signature algorithm (DSA) encryption method.

14. The operating method of claim 11, wherein the storage device further comprises a sub-memory tightly coupled to the core, and
the activating of the core comprises:
loading the processing code, stored in the first logical unit, to the sub-memory; and
interpreting the processing code by using the core.

15. A storage device comprising a memory controller and a memory device, wherein:
the memory controller comprises:
a core;
a sub-memory tightly coupled to the core; and
a non-volatile main memory connected to the core and the sub-memory, wherein:
the memory device is a first logical unit, is separately allocated for near-data processing (NDP), and is configured to store a processing code for executing a task, and
the core is configured to execute the task based on the processing code stored in the first logical unit,
wherein the core is configured to be activated when the core is in an idle status, and
wherein the storing of the processing code comprises:
checking, by using the memory controller, a size of the processing code based on a write command; and
segmenting and receiving, by using the memory controller, the processing code by a number of times corresponding to a size of the processing code.

16. The storage device of claim 15, wherein the task is executed when the core is in an idle status.

17. The storage device of claim 15, wherein the memory device comprises:
a boot area;
a user data area; and
a standard function area, and
the first logical unit is included in the standard function area.

18. The storage device of claim 17, wherein the core is configured to store an execution result of the task in a second logical unit included in the user data area.

* * * * *